US012614097B2

(12) United States Patent　　　　　(10) Patent No.:　US 12,614,097 B2
Gurwich et al.　　　　　　　　　　　　(45) Date of Patent:　Apr. 28, 2026

(54) METHODS AND SYSTEMS FOR HIGH-FIDELITY ZZ-ROTATION OF QUBITS

(71) Applicant: QEDMA Quantum Computing LTD., Tel-Aviv (IL)

(72) Inventors: Ilya Gurwich, Ramat-Gan (IL); Itsik Cohen, Ramat Gan (IL); Ron Melcer, Givatayim (IL); Shlomi Kotler, Givat Ram (IL)

(73) Assignee: QEDMA Quantum Computing LTD., Tel-Aviv (IL)

( * ) Notice: Subject to any disclaimer, the term of this patent is extended or adjusted under 35 U.S.C. 154(b) by 0 days.

(21) Appl. No.: 19/343,480

(22) Filed: Sep. 29, 2025

(65) Prior Publication Data

US 2026/0094037 A1　　Apr. 2, 2026

Related U.S. Application Data

(60) Provisional application No. 63/701,005, filed on Sep. 30, 2024.

(51) Int. Cl.
　　G06N 10/20　　　　(2022.01)
　　G06N 10/40　　　　(2022.01)
(52) U.S. Cl.
　　CPC ............. G06N 10/20 (2022.01); G06N 10/40 (2022.01)
(58) Field of Classification Search
　　None
　　See application file for complete search history.

(56) References Cited

U.S. PATENT DOCUMENTS

| | | | |
|---|---|---|---|
| 2018/0225586 A1* | 8/2018 | Chow ................... | G06N 10/20 |
| 2024/0062088 A1 | 2/2024 | Heya et al. | |
| 2024/0119337 A1 | 4/2024 | Xu et al. | |
| 2024/0303524 A1* | 9/2024 | Houck .................. | G06N 10/40 |

OTHER PUBLICATIONS

Gefen et al, "Enhancing the fidelity of two-qubit gates by measurements", Phys. Rev. A 95, 032314—Published Mar. 9, 2017, DOI: https://doi.org/10.1103/PhysRevA.95.032314 (Year: 2017).*

(Continued)

*Primary Examiner* — Viker A Lamardo
*Assistant Examiner* — Leah M Feitl
(74) *Attorney, Agent, or Firm* — Ballard Spahr LLP

(57) ABSTRACT

A method for performing a ZZ-rotation quantum gate acting on two qubits having an XX coupling and corresponding resonance frequencies. The method includes applying twice the following pulses: rotation pulses, and echo pulses. In each application of pulses, to each of the two qubits, a corresponding rotation pulse is applied. The rotation pulse has a corresponding phase, has a corresponding amplitude, and has a driving frequency $\omega^{(i)}$ distinct from each of the resonance frequencies, so that each of the two qubits is having a corresponding detuning $\Delta_{0,1}^{(i)}$. The echo pulse is commuting with a Pauli-ZZ operator associated with the two qubits. The echo pulse is applied so as to control a magnitude of any one of: $XX+\theta(\Delta_0^{(i)} \Delta_1^{(i)}) \cdot YY$ rotation, and $XY-\theta(\Delta_0^{(i)} \Delta_1^{(i)}) \cdot YX$ rotation. In each application of pulses, the echo pulse is applied after the rotation pulse.

20 Claims, 7 Drawing Sheets

(56) References Cited

OTHER PUBLICATIONS

Tripathi et al. "Suppression of crosstalk in superconducting qubits using dynamical decoupling." arXiv preprint arXiv:2108.04530 (2021). (Year: 2021).*

Nguyen et al. "Programmable Heisenberg interactions between Floquet qubits." arXiv preprint arXiv:2211.10383 (2022). (Year: 2022).*

Examination Report for Australian Application No. 2025242134 mailed Nov. 24, 2025.

Nguyen et al. "Programmable Heisenberg interactions between Floquet qubits" Nature Physics vol. 20, Jan. 16, 2024, pp. 240-246, https://doi.org/10.1038/s41567-023-02326-7.

Aoki et al. "Control of the ZZ Coupling betweem Kerr-cat qubits via Transmon Couplers" arXiv:2303.16622v4 [quant-ph], Jan. 22, 2024, pp. 1-14.

Yu et al. "Stabilizing the Kerr arbitrary cat states and holonomic universal control" funarXiv: 2406.13390v1 [quant-ph], Jun. 19, 2024, pp. 1-17.

Extended Search Report for European Application No. 25205797.1 mailed Feb. 16, 2026.

* cited by examiner

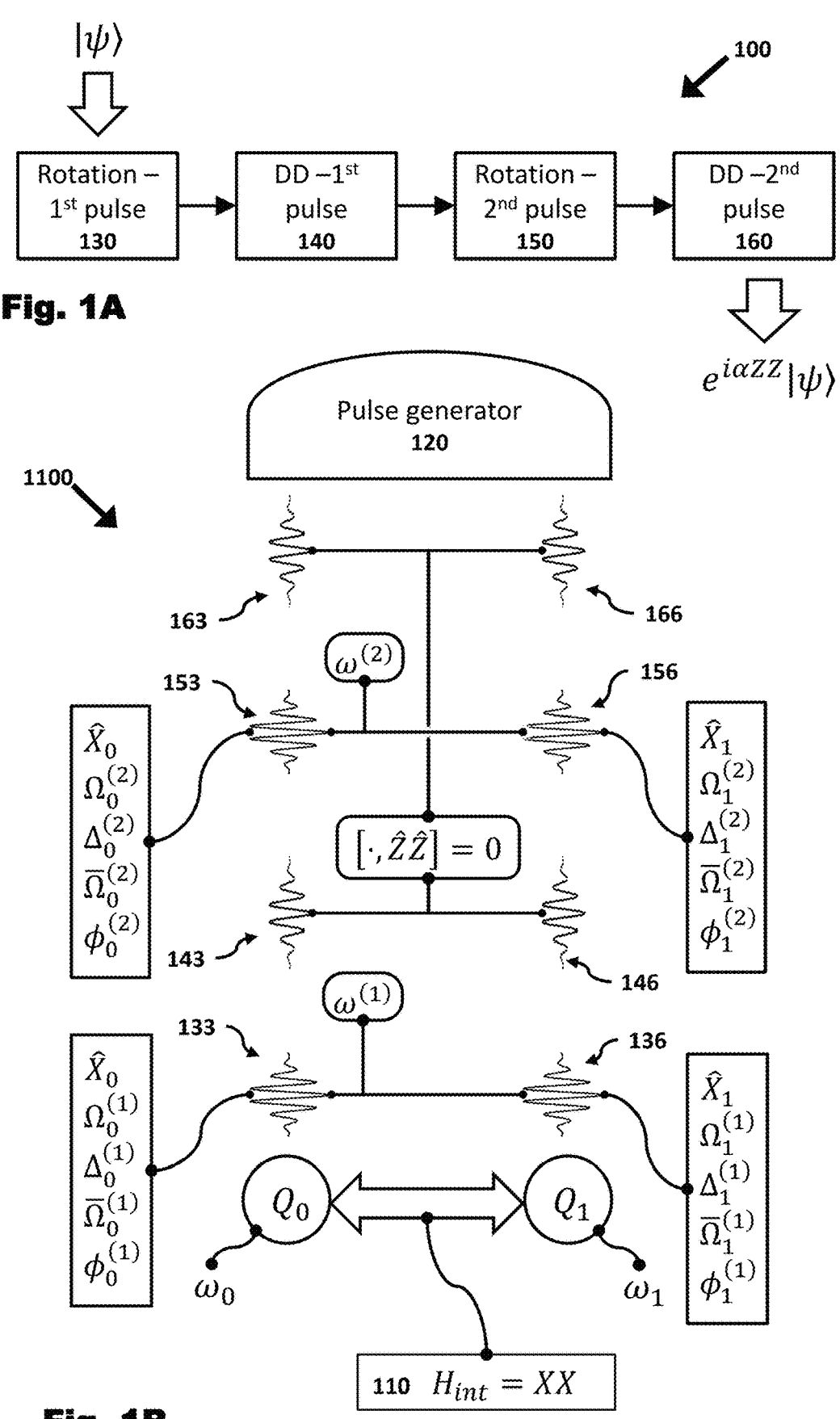

$|\psi\rangle$

| Rotation – 1st pulse 130 | DD –1st pulse 140 | Rotation – 2nd pulse 150 | DD –2nd pulse 160 |

$e^{i\alpha ZZ}|\psi\rangle$

Pulse generator 120

1100

163        166

$\omega^{(2)}$ 153        156

$\hat{X}_0$ $\Omega_0^{(2)}$ $\Delta_0^{(2)}$ $\bar{\Omega}_0^{(2)}$ $\phi_0^{(2)}$ $[\cdot, \hat{Z}\hat{Z}] = 0$ $\hat{X}_1$ $\Omega_1^{(2)}$ $\Delta_1^{(2)}$ $\bar{\Omega}_1^{(2)}$ $\phi_1^{(2)}$ 143        146

$\omega^{(1)}$ 133        136

$\hat{X}_0$ $\Omega_0^{(1)}$ $\Delta_0^{(1)}$ $\bar{\Omega}_0^{(1)}$ $\phi_0^{(1)}$ $Q_0$        $Q_1$ $\omega_0$        $\omega_1$ $\hat{X}_1$ $\Omega_1^{(1)}$ $\Delta_1^{(1)}$ $\bar{\Omega}_1^{(1)}$ $\phi_1^{(1)}$ 110 $H_{int} = XX$

Fig. 1B

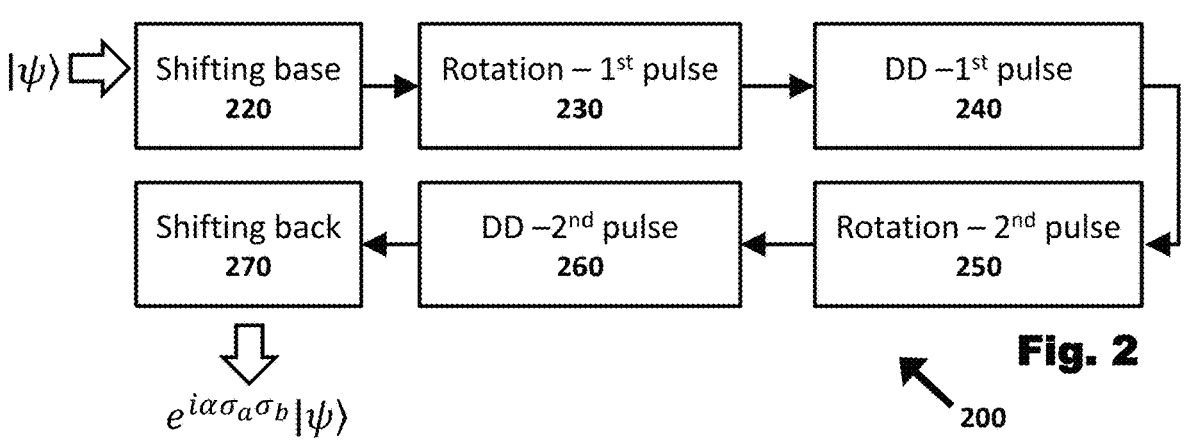

$|\psi\rangle \Rightarrow$ | Shifting base 220 | → | Rotation – 1st pulse 230 | → | DD –1st pulse 240 |

| Shifting back 270 | ← | DD –2nd pulse 260 | ← | Rotation – 2nd pulse 250 |

Fig. 2

$\downarrow$ $e^{i\alpha\sigma_a\sigma_b}|\psi\rangle$

200

---

300

$|\psi\rangle$ $\downarrow$

| Preceding single-qubit gates 310 |

| Shifting to $X$ base 323 | Shifting to $Y$ base 333 | Shifting to $Z$ base 343 |
| $ZZ$ 325 | $ZZ$ 335 | $ZZ$ 345 |
| $e^{i\alpha XX}$ 320 | $e^{i\beta YY}$ 330 | $e^{i\gamma ZZ}$ 340 |

| Succeeding single-qubit gates 350 |

$\downarrow$ $U|\psi\rangle$

COMMUNICATION CONNECTION(S)
770

PROCESSING UNIT(S)
710

OUTPUT DEVICE(S)     760

INPUT DEVICE(S)       750

MONITOR
780

STORAGE DEVICE(S)    740

RAM   727          MEMORY
720

SOFTWARE FOR DISCLOSED TECHINIQUES
729

ROM
722          BIOS   725

700

REMOTE COMPUTER     790

MEMORY/STORAGE     795

870

CONTROLLER
850

COMMUNICATION CONNECTION(S)
840

CLASSICAL PROCESSOR
820

QUANTUM PROCESSOR
810

MEASUREMENT DVICE
880

MEMORY     830

800

REMOTE COMPUTER     860

MEMORY/STORAGE     865

METHODS AND SYSTEMS FOR HIGH-FIDELITY ZZ-ROTATION OF QUBITS

CROSS REFERENCE TO RELATED APPLICATIONS

This application claims priority from U.S. Provisional Patent Application No. 63/701,005 filed on the Sep, 30, 2024, which is incorporated herein by reference in its entirety.

TECHNOLOGICAL FIELD

The present disclosure relates to the field of quantum computing, more specifically, to the field of error suppression.

BACKGROUND

The development of useful quantum computers relies crucially on the reduction of implementation errors—differences between the actual and ideal implementations of quantum logic operations.

Certain types of errors, namely coherent errors (including stochastic coherent errors and coherent interactions with an environment, below the relevant correlation time) can be significantly reduced via Quantum Error Suppression (QES). The characteristic feature of QES is that it requires no significant overhead in the number of qubits, circuit depth, or the number of circuit repetitions required to obtain results up to a given statistical error (the total number of 'shots'). A prototypical example of QES is 'dynamical decoupling', where a non-idle quantum circuit implements a better quantum memory than the idle circuit. An additional important example is given by 'Pauli twirling', where a single noisy circuit is replaced by an average over noisy circuits obtained by randomly adding certain Pauli layers. Though a number of distinct circuits must be used, the total number of shots needed is similar to that of the original circuit.

Further background to the presently disclosed subject matter may be provided in: [Nguyen et al., 2024] Nguyen, L. B., et. al. (2024), Programmable Heisenberg interactions between Floquet qubits, *Nature Physics*, 20(2):240-246

To note, the indication of the above publication herein is not to be inferred as meaning that the above publication is in any way relevant to the patentability of the presently disclosed subject matter. Especially, indication of the above publication herein is not to be inferred as meaning that the above publication is in any way denying patentability of any presently claimed subject matter.

General Description

A quantum gate usually suffers considerable coherent errors, of multiple rotation directions. Some errors are not necessarily errors from the standpoint of the hardware. In other words, the errors may not be an effect of non-ideal implementation of a gate, rather, the errors may be rotations that it is desired to eliminate, in order to implement a specific gate. For example, a single-qubit gate, implemented on a specific two-level-system, may ideally have a $\pi/4$ Pauli-X rotation action, and concurrently, a $\pi/16$ Pauli-Y rotation action. The Pauli-X rotation or the Pauli-Y rotation, may be unwanted. Sometimes, these rotations are minor relative to a main rotation action of the gate. Some times, these errors may be non-Markovian (i.e., have a time-dependent effect).

These errors may be referred in this disclosure as "oscillating errors". The oscillating errors may include single-qubit rotations, and two-qubit rotations. The effect of the oscillating errors depends on the resonance-frequencies of the qubits involved in performing the gate, on the frequency of the driving field(s), on cross talk with nearby qubits, and on anharmonic characteristics of the qubits (when applicable).

As a concrete example, superconducting qubits may be considered. Cross-resonance (CR) gates may be the most prolific 2-qubit gates for fixed frequency transmon architecture. In [Nguyen et al., 2024], the authors demonstrated an alternative gate, where both qubits are driven using a frequency far from their resonance, generating a ZZ rotation, and oscillating XX and YY terms. The XX and YY could also be made to not oscillate, generating Heisenberg gates. When applying this method to generate ZZ (CZ) gates, the authors relied on oscillating these extra terms (XX and YY) at a high frequency to minimize their impact.

The complex nature of the oscillating errors makes protocols for elimination (suppression) of these errors complicated, and thus, inefficient (e.g., new errors are introduced to the computation). Simple, robust, and efficient protocols for suppression of the oscillating errors are crucial for the function of current and future quantum computers.

The present disclosure provides a method to generate an optimal gate along with error suppression protocols, where oscillating implementation errors can be reduced, preferably eliminated.

Generally, qubits may be driven using a single frequency (or similar frequencies), and dynamical decoupling (echo) may be incorporated as a part of the pulse(s) generating the gate. This approach has several major advantages:

1. Most significantly, this approach allows working in optimal parameter range, where the XX and YY terms do not oscillate. Mainly, the frequency can be exactly in the middle of the two qubit resonance frequencies. Hence, a quantum gate, applied by a method according to the present disclosure, may be referred to as "mid-resonance" (MR) gate.
2. An echoed gate automatically removes the single qubit Z-rotations, including slow varying fluctuations, which are a main source of decoherence.
3. As all removed errors (XX, YY, ZI, IZ) commute with the (ideal) ZZ gate, there are no residual BCH terms and even for parameters far from the optimal range, the MR gate is less noisy than a CR gate.

In accordance with a first aspect of the presently disclosed subject matter, there is provided a method for performing a ZZ-rotation quantum gate. The ZZ-rotation quantum gate is acting on two qubits $Q_{0,1}$ having an XX coupling. Each qubit of the two qubits has a corresponding resonance frequency $\omega_{0,1}$. The method includes applying twice the following pulses: rotation pulses, and echo pulses. In each application of pulses, to each of the two qubits, a corresponding rotation pulse is applied. The rotation pulse has a driving frequency $\omega^{(i)}$ distinct from each of the resonance frequencies $\omega_{0,1}$, so that each of the two qubits is having a corresponding detuning $$\Delta_{0,1}^{(i)} = \omega^{(i)} - \omega_{0,1}.$$

The rotation pulse has a corresponding amplitude $$\Omega_{0,1}^{(i)},$$

so that each of the two qubits having a corresponding effective frequency $$\Omega_{0,1}^{(i)} \text{ being } \Omega_{0,1}^{(i)} = \theta\big(\Delta_{0,1}^{(i)}\big) \cdot \sqrt{\Delta_{0,1}^{(i)2} + \Omega_{0,1}^{(i)2}},$$

wherein $\theta(x)$ is the sign function. The rotation pulse has a corresponding phase $$\phi_{0,1}^{(i)}.$$

pulse has a Hamiltonian $$H_p = \Omega_{0,1}^{(i)} \hat{X}_{0,1} \cos\big(\omega^{(i)} t + \phi_{0,1}^{(i)}\big),$$

wherein $\hat{X}_{0,1}$ is a corresponding Pauli-X operator. In each application of pulses, to each of the two qubits, a corresponding echo pulse is applied. The echo pulse is commuting with a Pauli-ZZ operator associated with the two qubits. The echo pulse is applied so as to control a magnitude of any one of:

$$XX + \theta\big(\Delta_0^{(i)} \Delta_1^{(i)}\big) \cdot YY \text{ rotation, and } XY - \theta\big(\Delta_0^{(i)} \Delta_1^{(i)}\big) \cdot YX \text{ rotation.}$$

In each application of pulses, the echo pulse is applied after the rotation pulse. Each application (i) of the rotation pulses is associated with a corresponding set of driving frequency $\omega^{(i)}$, amplitudes $$\Omega_{0,1}^{(i)}$$

and phases $$\phi_{0,1}^{(i)}.$$

In addition to the above features, a method for performing a ZZ-rotation quantum gate, according to this aspect of the presently disclosed subject matter, can optionally comprise one or more of features (i) to (xvi) below, in any technically possible combination or permutation:

i. the echo pulses are configured to eliminate any one of the:

$$XX + \theta\big(\Delta_0^{(i)} \Delta_1^{(i)}\big) \cdot YY \text{ rotation, and } XY - \theta\big(\Delta_0^{(i)} \Delta_1^{(i)}\big) \cdot YX \text{ rotation.}$$

ii. the echo pulses are configured to eliminate both of the $$XX + \theta\big(\big(\Delta_0^{(i)} \Delta_1^{(i)}\big) \cdot YY \text{ rotation, and } XY - \theta\big(\Delta_0^{(i)} \Delta_1^{(i)}\big) \cdot YX \text{ rotation.}$$

iii. the corresponding echo pulses having an action $$\big[\hat{X}_0 \cos(\psi_0) + \hat{Y}_0 \sin(\psi_0)\big] \otimes \big[\hat{X}_1 \cos(\psi_1) + \hat{Y}_1 \sin(\psi_1)\big],$$

wherein, $\psi_0$, $\psi_1$ being predetermined phases corresponding the two qubits $Q_{0,1}$.

iv. any one of the following: (a) a sum of phases $$\phi_{MR}^{(1)} = \phi_0^{(1)} + \phi_1^{(1)}$$

associated with a first application of the rotation pulses, (b) a sum of phases $$\phi_{MR}^{(2)} = \phi_0^{(2)} + \phi_1^{(2)}$$

associated with a second application of the rotation pulses, and (c) a sum of phases $\psi = \psi_0 + \psi_1$, is configured for any one of: (I) control a magnitude of any one of the:

$$XX + \theta\big(\Delta_0^{(i)} \Delta_1^{(i)}\big) \cdot YY \text{ rotation, and } XY - \theta\big(\Delta_0^{(i)} \Delta_1^{(i)}\big) \cdot YX \text{ rotation,}$$

and eliminating the other, and (II) eliminate both of the:

$$XX + \theta\big(\Delta_0^{(i)} \Delta_1^{(i)}\big) \cdot YY \text{ rotation, and } XY - \theta\big(\Delta_0^{(i)} \Delta_1^{(i)}\big) \cdot YX \text{ rotation.}$$

v. any of the corresponding echo pulses having any one of actions: XY and YX.
vi. a difference of the corresponding phases $$\phi_0^{(i)} - \phi_1^{(i)}$$

equals an integer multiple of $\pi$.
vii. a driving frequency $\omega^{(1)}$ associated with a first application of the rotation pulses equals a driving frequency $\omega^{(2)}$ associated with a second application of the rotation pulses; and, wherein an amplitude $\Omega^{(1)}$ associated with a first application of the rotation pulses equals an amplitude $\Omega^{(2)}$ associated with a second application of the rotation pulses.
viii. the two qubits $Q_{0,1}$ are implemented based on two energy levels included in a multi-level quantum system.
ix. the echo pulses are configured to eliminate a IZ noise and a ZI noise.
x. the driving frequency $\omega^{(i)}$ is between a lower resonance frequency $\omega_0$ and a higher resonance frequency $\omega_1$.
xi. the driving frequency $\omega^{(i)}$ is in the range of $$\frac{1}{8}(5\omega_0 + 3\omega_1) \text{ to } \frac{1}{8}(3\omega_0 + 5\omega_1).$$

xii. the driving frequency $\omega^{(i)}$ is an average of the resonance frequencies $\omega_{0,1}$.
xiii. the driving frequency $\omega^{(i)}$ is lower than a lower resonance frequency $\omega_0$, or higher than a higher resonance frequency $\omega_1$.

xiv. one qubit q of the two qubits $Q_{0,1}$ is being in communication with a neighboring qubit $Q_n$, and wherein a difference between: a sum of phases $$\phi_{MR}^{(1)} = \phi_0^{(1)} + \phi_1^{(1)}$$

associated with a first application of the rotation pulses, and a sum of phases $$\phi_{MR}^{(2)} = \phi_0^{(2)} + \phi_1^{(2)}$$

associated with a second application of the rotation pulses, is configured to suppress a cross-resonance rotation on the one qubit q and the neighboring qubit $Q_n$.

xv. the sums of phases $$\phi_{MR}^{(1)}, \phi_{MR}^{(2)}$$

are configured to eliminate a cross-resonance rotation on the one qubit q and the neighboring qubit $Q_n$.

xvi. a ZZ rotation angle $\alpha_1$ associated with a first application of the rotation pulses, is equal to a ZZ rotation angle $\alpha_2$ associated with a second application of said rotation pulses.

In accordance with a second aspect of the presently disclosed subject matter, there is provided a method for performing a two-qubit Pauli-rotation quantum gate. The Pauli-rotation quantum gate is acting on two qubits $Q_{0,1}$. The two qubits $Q_{0,1}$ having an XX coupling. The method includes applying single-qubit rotations, to at least one of the two qubits $Q_{0,1}$, so as to shift a basis of the at least one of the two qubits $Q_{0,1}$ from a measurement basis to a rotation basis. The method includes applying a ZZ-rotation quantum gate to the two qubits $Q_{0,1}$. The ZZ-rotation quantum gate is according to the first aspect of the presently disclosed subject matter. The method includes applying single-qubit rotations to at least one of the two qubits $Q_{0,1}$, so as to shift back a basis of the at least one of the two qubits $Q_{0,1}$ from a rotation basis to a measurement basis.

In accordance with a third aspect of the presently disclosed subject matter, there is provided a method for performing a two-qubit quantum gate. The quantum gate acting on two qubits $Q_{0,1}$. The two qubits $Q_{0,1}$ having an XX coupling. The method includes performing the method according to the second aspect, so as to perform at least one of: XX rotation, YY rotation, and ZZ rotation. Corresponding rotation angles of the rotations are according to a KAK decomposition of the two-qubit quantum gate.

In accordance with a fourth aspect of the presently disclosed subject matter, there is provided a quantum processing unit. The quantum processing unit includes at least two qubits. The at least two qubits (i.e., the aforementioned two qubits, included in a plurality of qubits) are having an XX interaction. The quantum processing unit includes at least one pulse generator coupled to the at least two qubits, so as to apply pulses to the at least two qubits. The quantum processing unit includes a controller. The controller is communicating with the at least one pulse generator, so as to provide commands to the at least one pulse generator. The quantum processing unit is configured to implement the method according to any one of the first to third aspects of the presently disclosed subject matter.

In addition to the above features, a quantum processing unit according to this aspect of the presently disclosed subject matter, can optionally comprise one or more of features (i) to (iii) below, in any technically possible combination or permutation:

i. the at least one pulse generator is configured to apply radiofrequency pulses.

ii. the two qubits are superconducting qubits.

iii. the at least one pulse generator is configured to apply any one of: infrared pulses, visible light pulses, and ultraviolet pulses.

In accordance with a fifth aspect of the presently disclosed subject matter, there is provided a system including a computer, and a quantum processing unit. The computer having a pulse-level access to the quantum processing unit. The system is configured to implement a method according to any one of the first to third aspects of the presently disclosed subject matter.

According to some embodiments, the quantum processing unit is being according to the fourth aspect of the presently disclosed subject matter.

In accordance with a sixth aspect of the presently disclosed subject matter, there is provided a non-transient computer readable storage medium. The non-transient computer readable storage medium storing computer instructions. The computer instructions are used for causing a computer communicating with a quantum processing unit, to implement a method according to any one of the first to third aspects of the presently disclosed subject matter.

In accordance with a seventh aspect of the presently disclosed subject matter, there is provided a computer implemented method. The method includes simulating the method according to any one of first to third aspects of the presently disclosed subject matter.

In accordance with a eighth aspect of the presently disclosed subject matter, there is provided a non-transient computer readable storage medium. The non-transient computer readable storage medium storing computer instructions are used for causing a computer to perform a method according to the seventh aspect of the presently disclosed subject matter.

It is noted that the error suppression protocols can be modified so as to calibrate quantum gates, so as to have controlled rotation terms. The error suppression protocols may be performed according to results of a characterization protocol, so as for the calibrated gate having desired rotation terms. Thus, the present disclosure also provides a gate calibration protocol. The gate calibration protocol may be used, for example, when recompiling quantum circuits. The action of the oscillating implementation errors may rather be seen as desired quantum gates auxiliary to the main (ideal) action of the quantum gate being applied. This may benefit by, e.g., eliminating native gates that may be applied by the quantum processing unit, reducing memory requirements, running time, and/or reducing errors.

For brevity of the present disclosure, incoherent implementation errors are neglected. In other words, implementation errors are assumed to be coherent. It is noted that the methods, systems, and quantum circuits disclosed herein are applicable without this assumption.

In the present disclosure, the following terms and their derivatives may be understood according to the below explanations:

The terms "gate" and "quantum gate" may be synonyms.

The phrase "term", when relating to generators of quantum logic operations or implementation errors, may refer to an element of a generator or to a summand in a series expansion. For example, a matrix element in a matrix representation, a summand in a perturbation expansion, or a Pauli matrix in an expansion according to Pauli matrices.

The term "Pauli term" may refer to a matrix included in the Pauli group $\mathcal{P}$. The Pauli group is defined as the subgroup of the unitary group that includes tensor-products of the Pauli matrices. In formula:

$$\mathcal{P} = \{\hat{I}, \hat{X}, \hat{Y}, \hat{Z}\}^{\otimes n}.$$

The number of qubits may be implicit, and the subscript may be omitted. A Pauli term may be used for representing operators. As a shorthand, Pauli-terms may be denoted by a string of the characters I, X, Y, Z (e.g., XX, ZYI). Subscripts/superscripts may be included for any character as may be needed, according to context. A j'th character in the string may correspond a j'th qubit (e.g., XY denotes $\hat{X}$ corresponding a first qubit and $\hat{Y}$ corresponding a second qubit).

The term "transverse term" may denote a weighted-sum of Pauli-terms, each having no $\hat{Z}$ matrix included in the associated tensor-product.

The term "Pauli gate" may refer to any quantum gate that is represented by a matrix included in the Pauli group $\mathcal{P}$.

The symbol $\otimes$ may denote the Kronecker-product.

The notation $$X_j^\alpha$$

may denote a single-qubit rotation on a j'th qubit, the rotation having a mathematical representation of $\hat{X}$ cos $(\alpha) - Y \sin(\alpha)$, wherein a is a real number.

The term "direction" may refer to the phase $\alpha$ of an $$X_j^\alpha.$$

The term "based" may indicate that a first referred quantity may have a dependency on a second referred quantity. In other words, a first referred quantity may be a function of a second referred quantity, where the function is a non-constant.

Quantum gates executed by methods according to the present disclosure may be referred to as "EMR gates".

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 1A shows a flowchart schematically illustrating a method according to the present disclosure.

FIG. 1B schematically illustrates a system implementing a method schematically illustrated in FIG. 1A.

FIGS. 2-3 show flowcharts schematically illustrating methods according to the present disclosure.

8

Figure 4A:
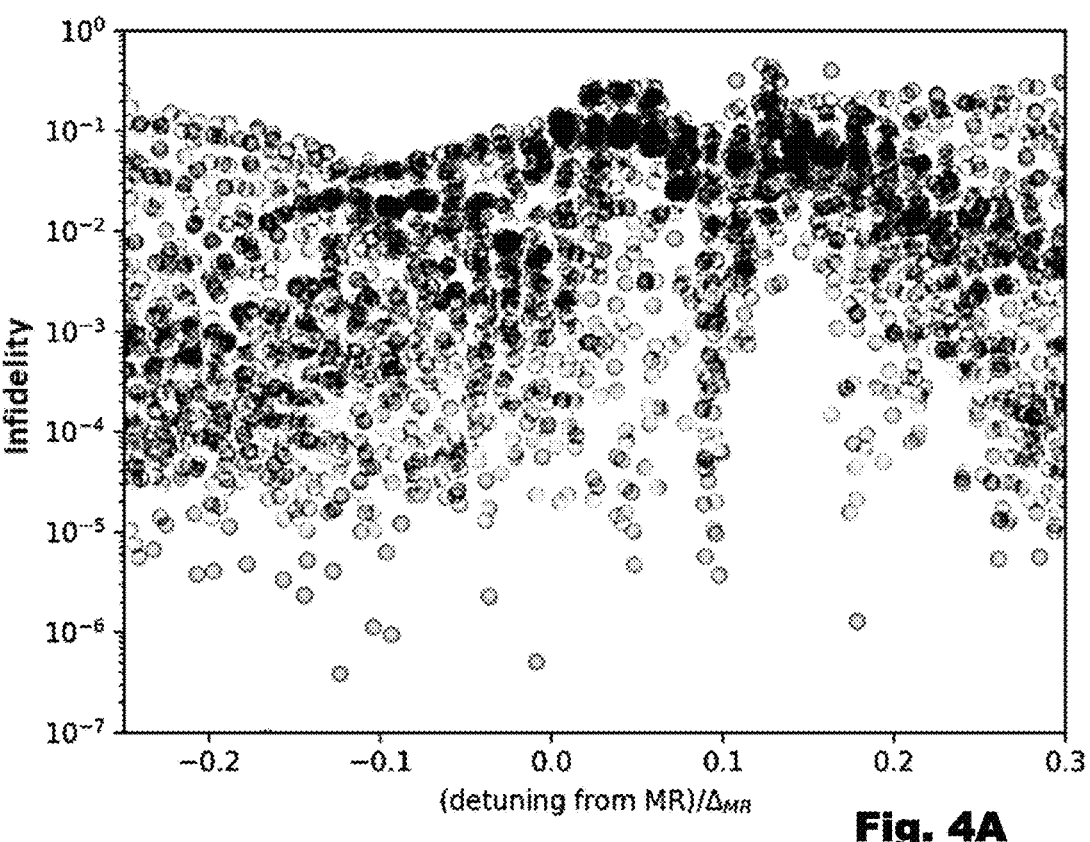

FIG. 4A presents a scatter graph showing simulated infidelity of bare ZZ-rotations.

Figure 4B:
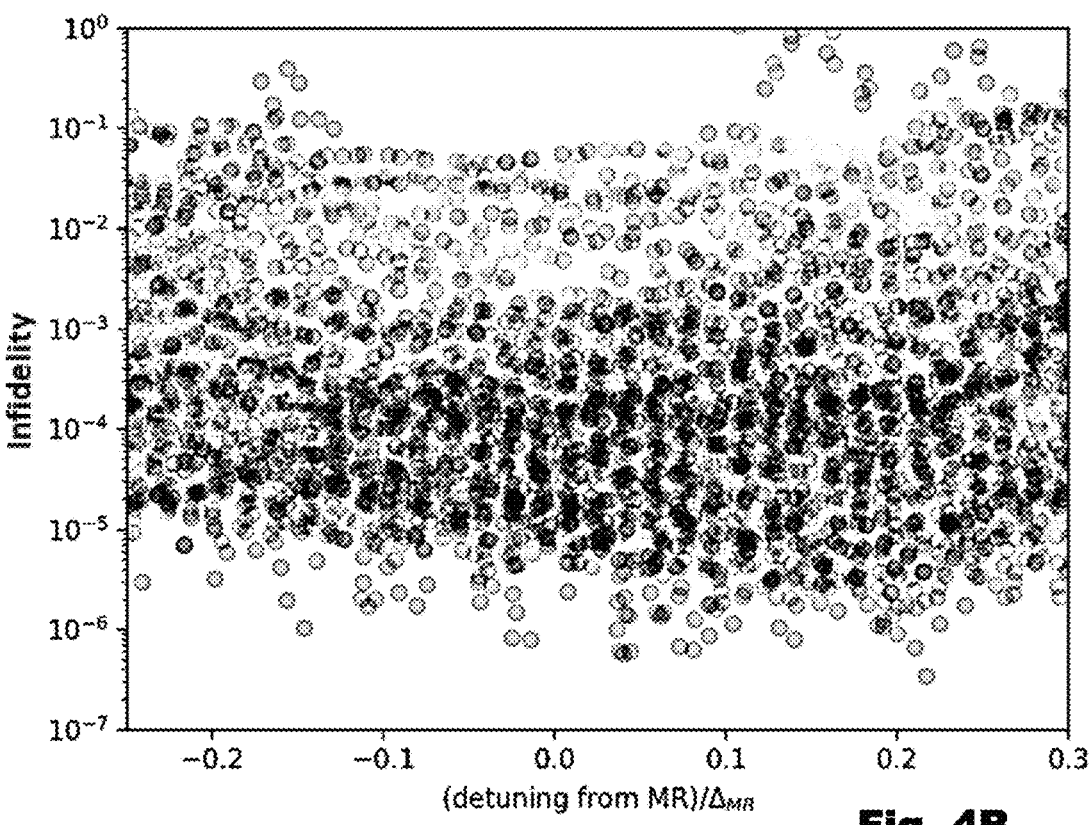

FIG. 4B presents a scatter graph showing simulated infidelity of ZZ-rotations performed using a method according to embodiments of the present disclosure.

Figure 5:
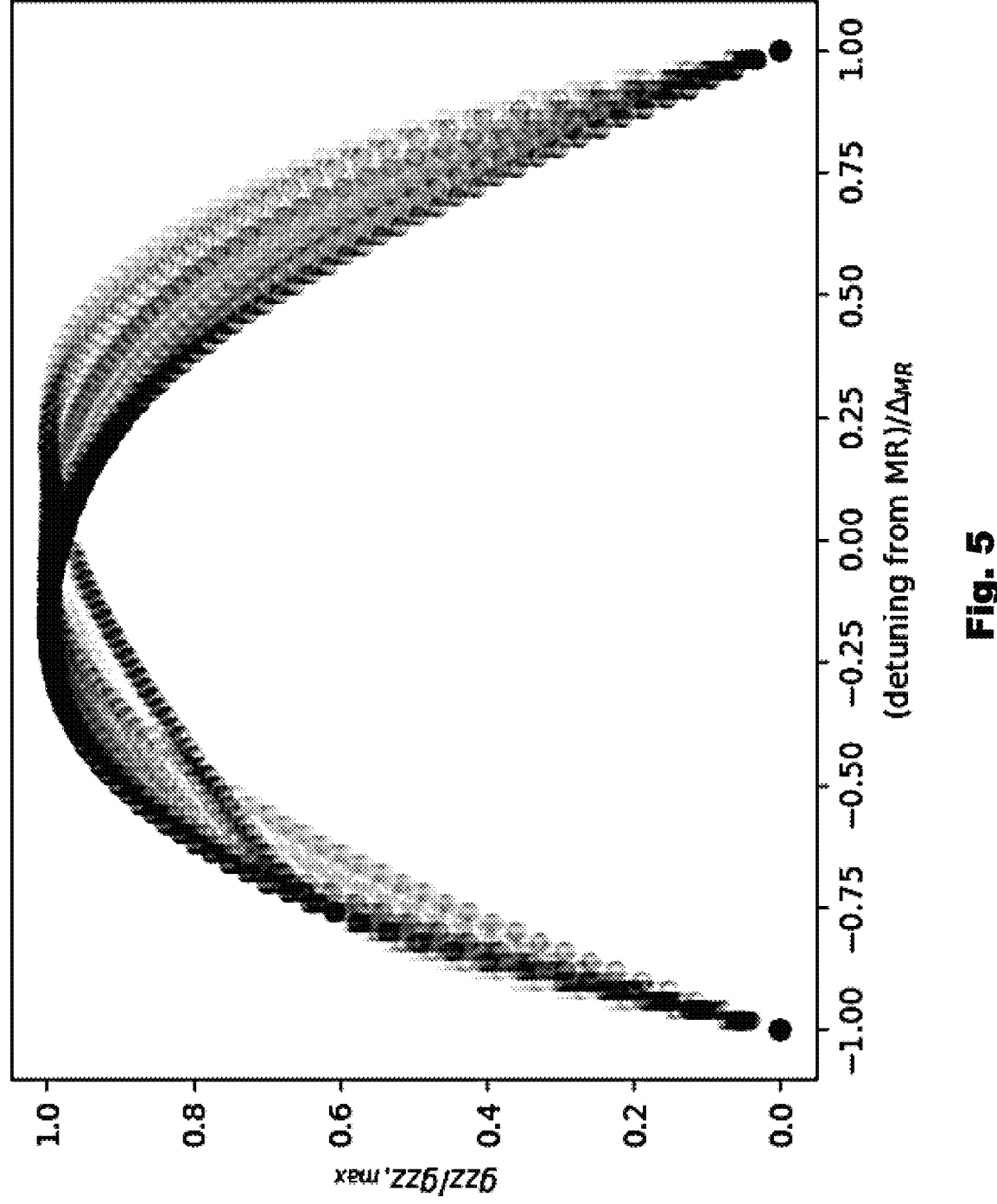

FIG. 5 presents a scatter graph showing a normalized magnitude of simulated ZZ-rotations performed by methods according to the present disclosure.

Figure 6A:
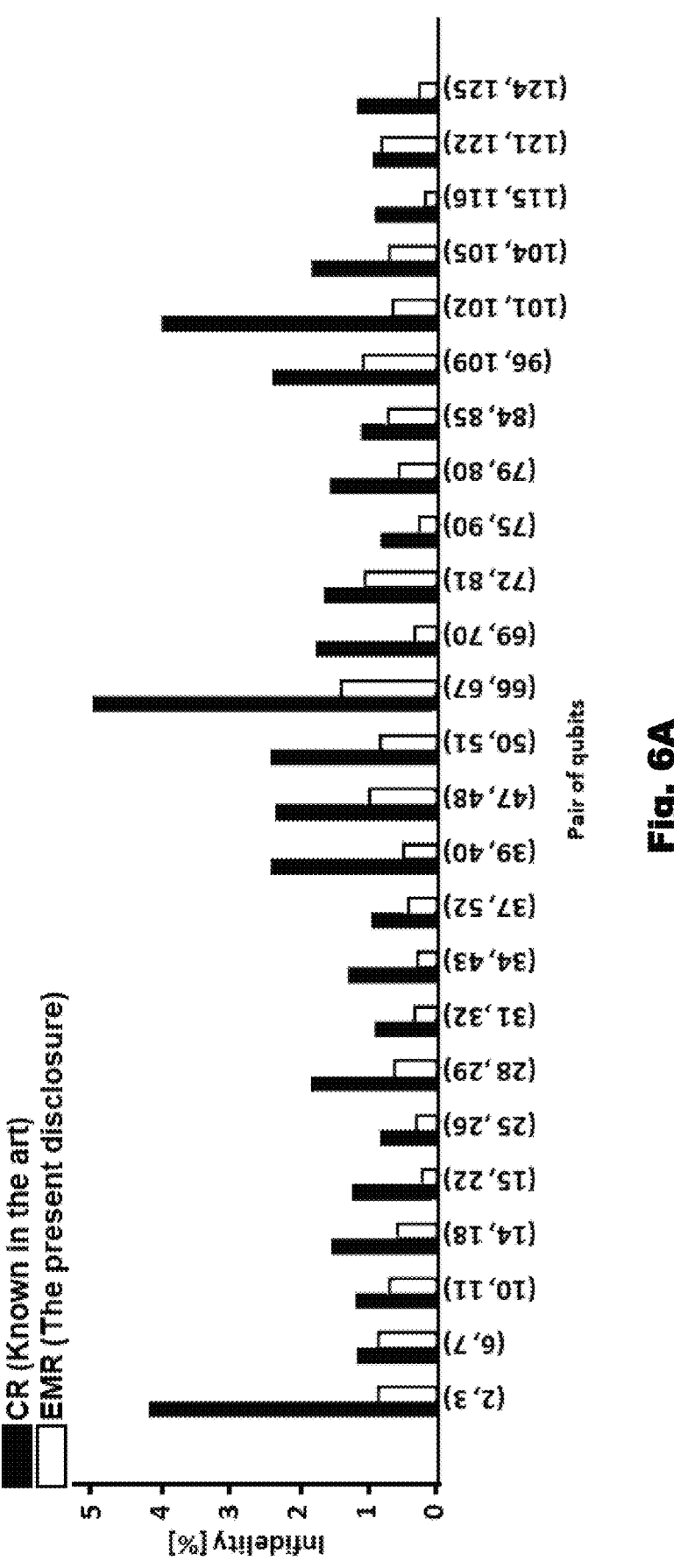
Figure 6B:
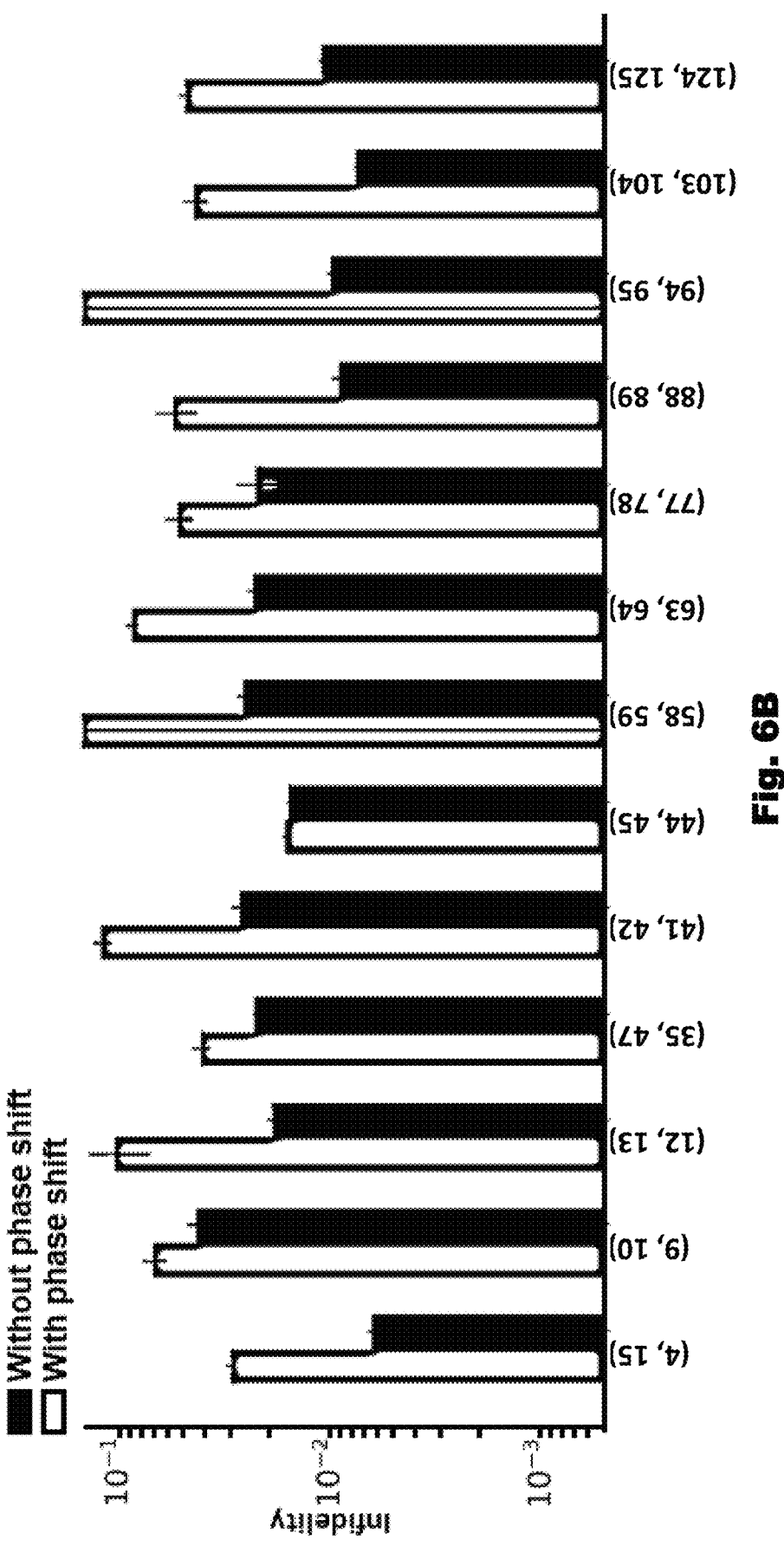

FIGS. 6A-6B present bar charts demonstrating the performance of error suppression methods according to embodiments of the present disclosure.

Figure 7:
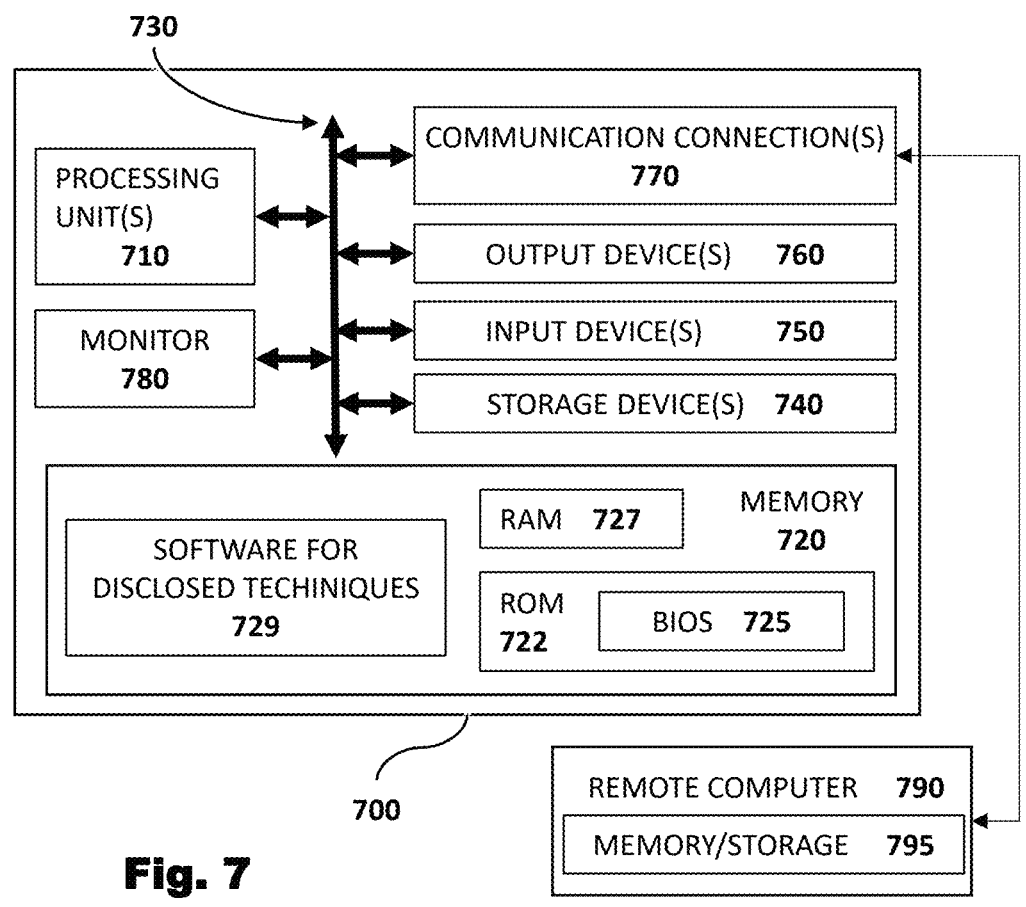

FIG. 7 schematically illustrates a computer implementing a method according to embodiments of the present disclosure.

Figure 8:
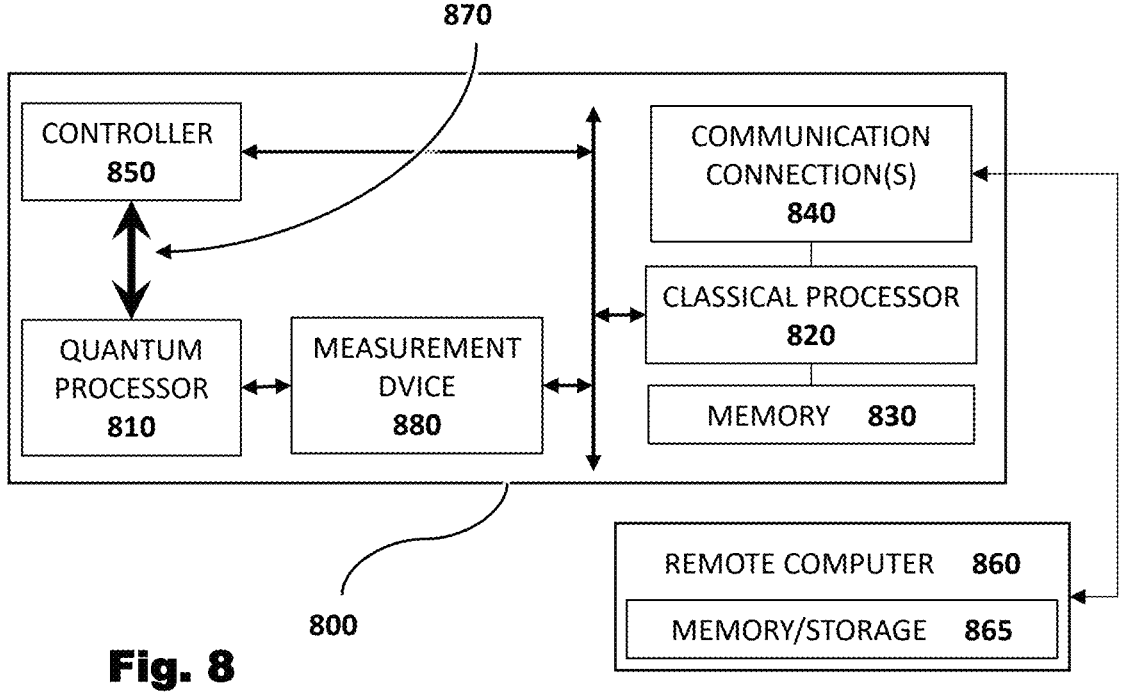

FIG. 8 schematically illustrates a system implementing a method according to embodiments of the present disclosure.

DETAILED DESCRIPTION OF EMBODIMENTS

Described herein are some examples of systems and methods useful for high-fidelity ZZ-rotation of qubits.

In the following detailed description, numerous specific details are set forth in order to provide a thorough understanding of the subject matter. However, it will be understood by those skilled in the art that some examples of the subject matter may be practiced without these specific details. In other instances, well-known methods, procedures and components have not been described in detail so as not to obscure the description.

As used herein, the phrases "for example," "such as", "for instance" and variants thereof describe non-limiting examples of the subject matter.

Reference in the specification to "one example", "some examples", "another example", "other examples, "one instance", "some instances", "another instance", "other instances", "one case", "some cases", "another case", "other cases" or variants thereof means that a particular described feature, structure, or characteristic is included in at least one example of the subject matter, but the appearance of the same term does not necessarily refer to the same example.

It should be appreciated that certain features, structures, and/or characteristics disclosed herein, which are, for clarity, described in the context of separate examples, may also be provided in combination with a single example. Conversely, various features, structures, and/or characteristics disclosed herein, which are, for brevity, described in the context of a single example, may also be provided separately or in any suitable sub-combination.

Unless specifically stated otherwise, as apparent from the following discussions, it is appreciated that throughout the specification discussions utilizing terms such as "computing", "determining", "running", or the like, may refer to the action(s) and/or process(es) of any combination of software, hardware, and/or firmware. For example, these terms may refer in some cases to the action(s) and/or process(es) of a programmable machine, that manipulates and/or transforms data represented as physical, such as electronic quantities, within the programmable machine's registers and/or memories, into other data similarly represented as physical quantities within the programmable machine's memories, registers, and/or other such information storage, transmission, and/or display element(s).

Reference is made to FIG. 1A and FIG. 1B. FIG. 1A shows a flowchart schematically illustrating a method 100 according to the present disclosure. FIG. 1B schematically illustrates a system 1100 implementing the method 100.

The method 100 may be for performing a ZZ rotation quantum gate. In other words, the method 100 may be for transforming a quantum state $|\psi\rangle$ to a quantum state $e^{i\alpha ZZ}|\omega\rangle$. The ZZ rotation quantum gate may act on two qubits $Q_{0,1}$ (i.e., a first qubit may be denoted $Q_0$, a second qubit may be denoted $Q_1$). The two qubits $Q_{0,1}$ may have an XX coupling 110. Each of the two qubits may have a corresponding resonance frequency $\omega_{0,1}$. I.e., the first qubit $Q_0$ may have a first resonance frequency $\omega_0$, the second qubit $Q_1$ may have a second resonance frequency $\omega_1$.

A Hamiltonian for the two qubits, without driving fields, may be:

$$H_0 = -\frac{1}{2}\sum_{j=0,1}\omega_j Z_j + g(\sigma_0^+\sigma_1^- + h.c.)$$

The Hamiltonian with driving fields applied may be:

$$H = H_0 + \sum_{j=0,1}\Omega_j X_j \cos(\omega t)$$

where:
1. The index j may index the qubits.
2. $\omega_j$ may denote a resonance frequency of the j'th qubit. Without loss of generality (switching of indexes), it will be assumed that $\omega_0 < \omega_1$.
3. $\omega$ may denote a frequency of the driving fields.
4. $\Omega$ may denote a Rabi-frequency of the driving fields (proportional to an amplitude thereof).
5. g may denote the qubit-qubit coupling strength.
6.

$$\sigma_j^\pm = \frac{1}{2}(X_j \pm iY_j)$$

may denote the raising/lowering operators. It is noted that up to a coordinate transformation, the interaction term $$(\text{i.e., } \sigma_0^+\sigma_1^- + h.c.)$$

is equal to XX+YY.
7. h.c. may denote the Hermitian conjugate.

The Hamiltonian may be referred to as "MR Hamiltonian". The average of the resonance frequencies may be referred to as "MR frequency", i.e., $$\omega_{MR} = \frac{1}{2}(\omega_0 + \omega_1).$$

It is noted that the driving fields may have an arbitrary shape, i.e., $\Omega_j$ may be a function of time.

Moving from the lab-frame to a frame rotating according to the terms of the driving pulse, and neglecting fast-rotating terms (i.e., applying the Rotating Wave Approximation), provides:

$$H = \frac{1}{2}\sum_{j=0,1}(\Omega_j X_j + \Delta_j Z_j) + g(\sigma_0^+\sigma_1^- + h.c.)$$

where $$\Delta_j = \omega - \omega_j$$

may denote a detuning of the driving field from the resonance frequency of a corresponding qubit.

Applying a coordinate-transformation:

$$\overline{\Omega}_j = \sqrt{\Delta_j^2 + \Omega_j^2}; \cos\alpha_j = \frac{|\Delta_j|}{\overline{\Omega}_j}; \sin\alpha_j = \frac{|\Delta_j|}{\Delta_j}\frac{\Omega_j}{\overline{\Omega}_j}$$

$$\overline{X}_j = X_j\cos\alpha_j = Z_j\sin\alpha_j; \overline{Z}_j = Z_j\cos\alpha_j + X_j\sin\alpha_j$$

provides:

$$H = \frac{1}{2}(\overline{\Omega}_0\overline{Z}_0 - \overline{\Omega}_1\overline{Z}_1) +$$
$$\frac{g}{4}\left[(\overline{X}_0\cos\alpha_0 + \overline{Z}_0\sin\alpha_0 - iY_0)(\overline{X}_1\cos\alpha_1 + \overline{Z}_1\sin\alpha_1 - iY_1) + h.c.\right]$$

Defining $$\overline{\sigma}_j^\pm = \frac{1}{2}(\overline{X} \pm iY)$$

provides:

$$H =$$
$$\frac{1}{2}(\overline{\Omega}_0\overline{Z}_0 - \overline{\Omega}_1\overline{Z}_1) + \frac{g}{2}\left[(\sin\alpha_0\sin\alpha_1\overline{Z}_0\overline{Z}_1 - (1-\cos\alpha_0\cos\alpha_1)(\sigma_0^+\sigma_1^+ + \sigma_0^-\sigma_1^-)\right]$$

Moving to a frame rotating according to the $$\frac{1}{2}(\overline{\Omega}_0\overline{Z}_0 - \overline{\Omega}_1\overline{Z}_1)$$

terms provides:

$$H = \frac{g}{4}\{2\sin\alpha_0\sin\alpha_1\overline{Z}_0\overline{Z}_1 + (1-\cos\alpha_0\cos\alpha_1)\big[$$
$$(Y_0Y_1 - \overline{X}_0\overline{X}_1)\cos(\overline{\Omega}_0 - \overline{\Omega}_1)t + (\overline{X}_0Y + Y_0\overline{X}_1)\sin(\overline{\Omega}_0 - \overline{\Omega}_1)t\big]\}$$

Thus, the Hamiltonian includes a (non-oscillating) ZZ term, and an oscillating XX–YY term. The XX–YY term may not oscillate when $\overline{\Omega}_0 = \overline{\Omega}_1$.

In some embodiments, the two qubits $Q_{0,1}$ may be implemented based on two energy levels included in a multi-level quantum system. In other words, a qubit may be implemented by a two-level subspace (e.g., a qubit implemented by a superconducting circuit). When a qubit is implemented by a two-level subspace, the ZZ term may be shifted (i.e., the coefficient of the ZZ term may change). The shifts can be large, and may be small if both $\Omega/|\Delta|$ and $|\Delta|/\eta$ are small, where $\eta$ may denote the negative of the anharmonicity (so that the value of $\eta$ is positive). The anharmonicity is e.g., the a difference between coefficients of terms in the Hamiltonian of a superconducting qubit. The coefficients may be for the transition between the ground level and the first exited level, and for the transition between the first exited level and the second excited level. In other words, η may be $$\eta = \langle 1|H|0 \rangle - \langle 2|H|1 \rangle.$$

Further, single-qubit Z-rotations (i.e., IZ, ZI terms) may be added, due to Stark-Shifts and ZZ interactions in subspaces outside the qubit's subspace (e.g., the subspace spanned by the second excited energy level, and the first exited level, in a superconducting qubit).

A phase of the driving fields may be considered. The Hamiltonian (in the lab frame) may be:

$$H = H_0 + \sum_{j=0,1} \Omega_j X_j \cos(\omega t + \phi_j)$$

The coefficients of the different terms of the Hamiltonian, in the frame rotating according to the $$\frac{1}{2}(\overline{\Omega}_0 Z_0 - \overline{\Omega}_1 Z_1)$$

terms, may now be as follows. For the $Z_0 Z_1$ term:

$$H_{ZZ} = \frac{g}{2}\sin\alpha_0\sin\alpha_1\cos(\phi_1 - \phi_0)Z_0 Z_1$$

For the $Y_0 Y_1 - X_0 X_1$ term:

$$H_{YY-XX} = \frac{g}{4}\{(1 - \cos\alpha_0\cos\alpha_1)\cos(\phi_1 - \phi_0)\cos[(\overline{\Omega}_0 - \overline{\Omega}_1)t + \phi_1 + \phi_0] + (\cos\alpha_0 - \cos\alpha_1)\sin(\phi_1 - \phi_0)\sin[(\overline{\Omega}_0 - \overline{\Omega}_1)t + \phi_1 + \phi_0]\}$$

For the $X_0 Y + Y_0 X_1$ term:

$$H_{XY-YX} = \frac{g}{4}\{-(1 - \cos\alpha_0\cos\alpha_1)\cos(\phi_1 - \phi_0)\sin[(\overline{\Omega}_0 - \overline{\Omega}_1)t + \phi_1 + \phi_0] + (\cos\alpha_0 - \cos\alpha_1)\sin(\phi_1 - \phi_0)\cos[(\overline{\Omega}_0 - \overline{\Omega}_1)t + \phi_1 + \phi_0]\}$$

The sum of the two phases may be referred to as "MR phase", and may be denoted $\phi_{MR}$, i.e., $$\phi_M = \phi_1 + \phi_0.$$

Some special cases are notable:

$\phi_1 = \phi_0$ gives a ZZ gate, with oscillating YY–XX (equivalently, XY+YX) term. The oscillating terms may be negligible if $\overline{\Omega}_0 - \overline{\Omega}_1 \gg 1$ (oscillating very quickly). If $\overline{\Omega}_0 \approx \overline{\Omega}_1$ (oscillating very slowly, or not oscillating at all), then for dynamically decoupling the YY–XX term (as explained hereinbelow), the phases may preferably be set to $\phi_1 = \phi_0 = 0$.

$\phi_1 - \phi_0 = \pi/2$ eliminates the ZZ term. If the other terms are oscillating (quickly enough), this will be a noisy idle. If $\overline{\Omega}_0 \approx \overline{\Omega}_1$, then iSWAP-like gates may be obtained, depending on the exact phases.

The (coefficient of the) ZZ term gets suppressed by a $\cos(\phi_1 - \phi_0)$ factor, so calibrating the phase may be required. As the damping factor is a cosine, the sensitivity to a small phase mismatch is low. For example, to lose 1% of the ZZ Hamiltonian term value, an error of 0.14 radians (8 degrees) in $\phi_1 - \phi_0$, which is an unlikely-large calibration error (e.g., calibration errors are usually in the few-milliradian range on current superconducting hardware). $\phi_{MR}$ defines the direction of the oscillating errors in the plane perpendicular to the X–Y axis. In other words, $\phi_{MR}$ rotates the YY–XX and XY+YX terms around the X–Y axis.

In performing method 100, leveraging the MR ZZ generator may be desired (i.e., using the ZZ term in the MR Hamiltonian). However, as indicated hereinabove, XX, YY, ZI, IZ generators (rotations) may be present. The unwanted rotations may be removed by applying an echo pulse that may anti-commute with the XX, YY, ZI, IZ generators.

The method 100 may include a step 130 of applying a $1^{st}$ rotation pulse. The step 130 may include applying (e.g., via a pulse generator 120) to each of the two qubits $Q_{0,1}$, a corresponding rotation pulse (depicted as pulses 133 136).

Each of the rotation pulses may have a corresponding phase $$\phi_{0,1}^{(1)}.$$

Each of the rotation pulses may have a driving frequency $\omega^{(1)}$. The driving frequency $\omega^{(1)}$ may be distinct from each of the resonance frequencies $\omega_{0,1}$. Each of the two qubits $Q_{0,1}$ may have a corresponding detuning $$\Delta_{0,1}^{(1)} = \omega^{(1)} - \omega_{0,1}.$$

Each of the rotation pulses may have a corresponding amplitude $$\Omega_{0,1}^{(1)},$$

so that each of the two qubits $Q_{0,1}$ may have a corresponding effective frequency $$\overline{\Omega}_{0,1}^{(1)}$$

(i.e., an effective Rabi frequency). The effective frequency may be $$\overline{\Omega}_{0,1}^{(1)} = \theta(\Delta_{0,1}^{(1)}) \cdot \sqrt{\Delta_{0,1}^{(1)2} + \Omega_{0,1}^{(1)2}} \cdot \theta(x)$$

may denote the sign function. Thus, each rotation pulse may have a Hamiltonian $$H_P = \Omega_{0,1}^{(1)} \hat{X}_{0,1} \cos(\omega^{(1)} t + \phi_{0,1}^{(1)}),$$

where $\hat{X}_{0,1}$ may be a corresponding Pauli-X operator.

The method 100 may include a step 140 of applying a $1^{st}$ dynamical decoupling pulse. In other words, applying a $1^{st}$ echo pulse. The step 140 may include applying (e.g., via the pulse generator 120) to each of the two qubits $Q_{0,1}$, a corresponding echo pulse (depicted as pulses 143 146).

The $1^{st}$ echo pulse may commute with a Pauli-ZZ operator, associated with the two qubits $Q_{0,1}$. In other words, the term(s) in the Hamiltonian associated with the $1^{st}$ echo pulse, may commute with the Pauli-ZZ operator, associated with the two qubits $Q_{0,1}$. The $1^{st}$ echo pulse may be applied so as to control a magnitude of any one of:

$$XX + \theta\left(\Delta_0^{(1)}\Delta_1^{(1)}\right) \cdot YY \text{ rotation, and } XY - \theta\left(\Delta_0^{(1)}\Delta_1^{(1)}\right) \cdot YX \text{ rotation.}$$

The $1^{st}$ echo pulse may be applied after the $1^{st}$ rotation pulse, i.e., step 140 may be performed after step 130.

The method 100 may include a step 150 of applying a $2^{nd}$ rotation pulse. The step 150 may include applying (e.g., via a pulse generator 120) to each of the two qubits $Q_{0,1}$, a corresponding rotation pulse (depicted as pulses 153 156).

Each of the rotation pulses may have a corresponding phase $$\phi_{0,1}^{(2)}.$$

Each of the rotation pulses may have a driving frequency $\omega^{(2)}$. The driving frequency $\omega^{(2)}$ may be distinct from each of the resonance frequencies $\omega_{0,1}$. Each of the two qubits $Q^{(2)}$ may have a corresponding detuning $$\Delta_{0,1}^{(2)} = \omega^{(2)} - \omega_{0,1}.$$

Each of the rotation pulses may have a corresponding amplitude $$\Omega_{0,1}^{(2)},$$

so that each of the two qubits $Q_{0,1}$ may have a corresponding effective frequency $$\overline{\Omega}_{0,1}^{(2)}$$

(i.e., an effective Rabi frequency). The effective frequency may be $$\overline{\Omega}_{0,1}^{(2)} = \theta\left(\Delta_{0,1}^{(2)}\right) \cdot \sqrt{\Delta_{0,1}^{(2)^2} + \Omega_{0,1}^{(2)^2}} \cdot \theta(x)$$

may denote the sign function. Thus, each rotation pulse may have a Hamiltonian $$H_p = \Omega_{0,1}^{(2)} \hat{X}_{0,1} \cos\left(\omega^{(2)}t + \phi_{0,1}^{(2)}\right),$$

where $\hat{X}_{0,1}$ may be a corresponding Pauli-X operator.

The method 100 may include a step 160 of applying a $2^{nd}$ dynamical decoupling pulse. In other words, applying a $2^{nd}$ echo pulse. The step 160 may include applying (e.g., via the pulse generator 120) to each of the two qubits $Q_{0,1}$, a corresponding echo pulse (depicted as pulses 163 166).

The $2^{nd}$ echo pulse may commute with a Pauli-ZZ operator, associated with the two qubits $Q_{0,1}$. In other words, the term(s) in the Hamiltonian associated with the $2^{nd}$ echo pulse, may commute with the Pauli-ZZ operator, associated with the two qubits $Q_{0,1}$. The $2^{nd}$ echo pulse may be applied so as to control a magnitude of any one of:

$$XX + \theta\left(\Delta_0^{(2)}\Delta_1^{(2)}\right) \cdot YY \text{ rotation, and } XY - \theta\left(\Delta_0^{(2)}\Delta_1^{(2)}\right) \cdot YX \text{ rotation.}$$

The $2^{nd}$ echo pulse may be applied after the $2^{nd}$ rotation pulse, i.e., step 160 may be performed after step 150.

In other words, steps 130 150 may be described as applying twice to each of the two qubits $Q_{0,1}$, a corresponding rotation pulse. The applications of rotation pulses may be indexed by index i. Each rotation pulse may have a driving frequency $\omega^{(i)}$ distinct from each of the resonance frequencies $\omega_{0,1}$, so that each of the two qubits $Q_{0,1}$ may have a corresponding detuning $$\Delta_{0,1}^{(i)} = \omega^{(i)} - \omega_{0,1}.$$

Each rotation pulse may have a corresponding amplitude $$\Omega_{0,1}^{(i)},$$

so that each of the two qubits $Q_{0,1}$ may have a corresponding effective frequency $$\overline{\Omega}_{0,1}^{(i)} \text{ being } \overline{\Omega}_{0,1}^{(i)} = \theta\left(\Delta_{0,1}^{(i)}\right) \cdot \sqrt{\Delta_{0,1}^{(i)^2} + \Omega_{0,1}^{(i)^2}},$$

where $\theta(x)$ may denote the sign function. Each rotation pulse may have a corresponding phase $$\phi_{0,1}^{(i)}.$$

Thus, each rotation pulse may have a Hamiltonian $$H_p = \Omega_{0,1}^{(i)} \hat{X}_{0,1} \cos\left(\omega^{(i)}t + \phi_{0,1}^{(i)}\right),$$

where $\hat{X}_{0,1}$ may be a corresponding Pauli-X operator. Each application (i) of a rotation pulse may be associated with a corresponding set of driving frequency $\omega^{(i)}$, amplitudes $$\Omega_{0,1}^{(i)}$$

and phases $$\phi_{0,1}^{(i)}.$$

Further, steps 140 160 may be described as applying twice to each of the two qubits $Q_{0,1}$ a corresponding echo pulse. The echo pulses may commute with a Pauli-ZZ operator associated with the two qubits $Q_{0,1}$, so as to control a magnitude of any one of:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

An echo pulse of index i may be applied after a rotation pulse of the same index.

Each application of rotation pulses (i.e., each of the steps 130 150) may provide a ZZ rotation according to a corresponding angle. The sum of the corresponding rotation angles may be the total rotation angle $\alpha$. In some embodiments, the corresponding rotation angles may be equal, i.e., each of the steps 130 150 may provide a ZZ rotation according to an angle $\alpha/2$. In other words, a ZZ rotation angle $\alpha_i$ associated with a first application of rotation pulses, may be equal to a ZZ rotation angle $\alpha_2$ associated with a second application of the rotation pulses.

In some embodiments, any one of the parameters (i.e., driving frequency $\omega^{(i)}$, amplitudes $$\Omega_{0,1}^{(i)}$$

and phases $$\phi_{0,1}^{(i)}$$

of the rotation pulses associated with a first application of rotation pulses, may be equal to the corresponding parameter associated with a second application of rotation pulses. For example, in some embodiments, the driving frequency $\omega^{(1)}$ associated with the first application of the rotation pulse, may equal the driving frequency $\omega^{(2)}$ associated with the second application of the rotation pulse. Further, the amplitude $\Omega^{(1)}$ associated with the first application of rotation pulse, may equal the amplitude $\Omega^{(2)}$ associated with the second application of rotation pulse.

In some embodiments, all the parameters of the rotation pulses associated with a first application of rotation pulses, may be equal to the corresponding parameter associated with a second application of rotation pulses. In other words, the rotation pulses of the first application, may be identical to the rotation pulses of the second application.

In some embodiments, the echo pulses may be configured to eliminate the $$XX + \theta\left(\Delta_0^{(i)}\Delta_1^{(i)}\right) \cdot YY \text{ rotation, or the } XY - \theta\left(\Delta_0^{(i)}\Delta_1^{(i)}\right) \cdot YX \text{ rotation.}$$

In some embodiments, the echo pulses may be configured to eliminate both the $$XX + \theta\left(\Delta_0^{(i)}\Delta_1^{(i)}\right) \cdot YY \text{ rotation, and the } XY - \theta\left(\Delta_0^{(i)}\Delta_1^{(i)}\right) \cdot YX \text{ rotation.}$$

In some embodiments, the echo pulses may be configured to eliminate a IZ noise and a ZI noise (e.g., in embodiments where qubits may be implemented as two-level subspaces).

Examples of echo pulses may now be detailed. A convenient choice for an echo pulse may be an XY echo. I.e., a pulse having an action of a Pauli-XY gate. With this choice, ZZ-rotation quantum gate, performed according to method 100 where rotation angles corresponding steps 130 150 may be equal, may have a form: EMR($\alpha$)=MR($\alpha$/2)×XY×MR($\alpha$/2)×XY. EMR($\alpha$) may denote a ZZ rotation quantum gate rotating by an angle $\alpha$, performed according to method 100. MR($\alpha$) may denote an action of a rotating pulse having a MR Hamiltonian (i.e., as derived hereinabove) configured to include a ZZ rotation by an angle $\alpha$.

The XY echo may be applied for the case where the driving frequency may be the MR frequency, and where the phases may be so $\phi_{MR}=0$. In some embodiments, the echo pulses may be of the form $X^{\omega 0}X^{\psi 1}$. In other words, the echo pulses may be of the form:

$$[\hat{X}_0 \cos(\psi_0)+\hat{Y}_0 \sin(\omega_0)] \otimes [\hat{X}_1 \cos(\omega_1)+\hat{Y}_1 \sin(\psi_1)]$$

the phases $\psi_0, \psi_1$ may correspond the two qubits $Q_{0,1}$. A ZZ rotation quantum gate, performed according to method 100, may have a form:

$$EMR(\alpha)=MR(\alpha/2) \times X^{\psi 0}X^{\psi 1} \times MR(\alpha/2) \times X^{\psi 0}X^{\psi 1}.$$

In some embodiments, the phases $$\phi_{0,1}^{(i)}$$

may be configured to control a magnitude of any one of the:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation,}$$

and eliminating the other rotation, and/or configured eliminate both of the:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

In some embodiments, a sum of phases $$\phi_{MR}^{(1)} = \phi_0^{(1)} + \phi_1^{(1)}$$

associated with a first application of the rotation pulses, a sum of phases $$\phi_{MR}^{(2)} = \phi_0^{(2)} + \phi_1^{(2)}$$

associated with a second application of the rotation pulses, and/or a sum of phases $$\psi=\psi_0+\psi_1,$$

may be configured to control a magnitude of any one of the:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation,}$$

and eliminating the other rotation, and/or configured eliminate both of the:

$$XX + \theta\!\left(\Delta_0^{(i)}\Delta_1^{(i)}\right)\cdot YY \text{ rotation, and } XY - \theta\!\left(\Delta_0^{(i)}\Delta_1^{(i)}\right)\cdot YX \text{ rotation.}$$

In some embodiments, a difference of the corresponding phases $$\phi_0^{(i)} - \phi_1^{(i)}$$

may equal an integer multiple of $\pi$.

In some embodiments, the phases $\psi_0, \psi_1$ may be determined according to the equation:

$$\psi_0 + \psi_1 = (\Delta_0 + \Delta_1)\!\left(t_0 + t_g + t_x/2\right) + \left(\phi_{MR}^{(1)} + \phi_{MR}^{(2)} + \pi\right)/2$$

where $t_0$ may denote a beginning time of the ZZ rotation quantum gate (i.e., a beginning time of performing the method 100), $t_x$ may denote a duration of applying an echo pulse, $t_g$ may denote a total time of the ZZ rotation quantum gate (i.e., a total time of performing the method 100), and $$\phi_{MR}^{(1)}, \phi_{MR}^{(2)}$$

may denote the MR phase associated with, respectively, the first and second applications of rotation pulses.

In some embodiments, the phases may be predetermined. In some other embodiments, the method 100 may include computing the phases $\psi_0, \psi_1$.

The XY echo may be a special case of the general case, where $\psi_0 = 0, \psi_1 = \pi/2$.

In some embodiments, any of the corresponding echo pulses may have any one of actions: XY and YX. It is noted that the constraint imposed by the equation is on the sum of the phases $\psi_0, \psi_1$. Thus, a degree of freedom in choosing the phases $\psi_0, \psi_1$ may be present, in addition to other degrees of freedom, e.g., degrees of freedom in choosing the values of $$\phi_{MR}^{(i)}.$$

This may enable, for example, optimizing the ZZ gate according to other considerations, such as capabilities and a noise model of the underlying hardware.

The XX, YY, ZI, IZ terms are all commutative with ZZ term, so these echo pulses may leave no residual Baker-Campbell-Hausdorff (BCH) terms. This provides an advantage over echoed-CR. In a CR gate, the control echo pulse is unable to decouple the Z noise on the target qubit. Further, a CR generates residual BCH terms stemming from the anti-commutation of the ZX and IZ terms (which remain unchanged by the echo pulse), and the ZZ and IX terms (which are sign-flipped by echo pulse).

Generally, the method 100 may be performed with any driving frequency, that may be distinct from each of the resonance frequencies $\omega_{0,1}$. In some embodiments, the driving frequency $\omega^{(i)}$ may be between a lower resonance frequency (i.e., $\omega_0$) and a higher resonance frequency (i.e., $\omega_1$). In other words, the condition $\omega_0 < \omega^{(i)} < \omega_1$ may hold. In some embodiments, the driving frequency $\omega^{(i)}$ may be lower than the lower resonance frequency (i.e., $\omega_0$), or may be higher than the higher resonance frequency (i.e., $\omega_1$). In other words, one of the conditions: $\omega^{(i)} < \omega_0$, $\omega_1 < \omega^{(i)}$ may hold.

Specific frequency ranges may be especially advantageous. In some embodiments, the driving frequency $\omega^{(i)}$ may be in the range of $$\frac{1}{8}(5\omega_0 + 3\omega_1) \text{ to } \frac{1}{8}(3\omega_0 + 5\omega_1).$$

As described hereinbelow, this range was demonstrated to be notably advantageous. In some embodiments, the driving frequency $\omega^{(i)}$ may be an average of the resonance frequencies $\omega_{0,1}$ (i.e., $\omega^{(i)} = \omega_{MR}$). As described hereinbelow, this frequency was demonstrated to be especially advantageous in some examples.

While in EMR gates the driving frequency is distinct from the resonance frequencies of the two qubits $Q_{0,1}$, the driving frequency might be similar to a resonance frequency of a neighboring qubit $Q_n$, communicating with one of the two qubits $Q_{0,1}$. I.e., a neighboring qubit $Q_n$ may have crosstalk with a qubit q being one qubit included in the two qubits $Q_{0,1}$. In such a case, the EMR gate may drive a cross-resonance between the qubit q and the neighboring qubit $Q_n$, thereby being a source of infidelity to the EMR gate. In other words, an unwanted cross-resonance rotation gate may act on the qubit q and on the neighboring qubit $Q_n$.

The detuning between the driving field (of a rotating pulse) and the neighboring qubit $Q_n$ may be denoted $$\Delta_n^{(i)}, \text{ i.e., } \Delta_n^{(i)} = \omega^{(i)} - \omega_n. \text{ If } \Delta_n^{(i)} = 0,$$

the echo pulses may dynamically-decouple the cross-resonance, in other words, the echo pulses may intrinsically cancel the effects of the cross-resonance. If $$\Delta_n^{(i)} \neq 0,$$

the phases $$\phi_{0,1}^{(i)}$$

may be set so that a rotation-angle of the cross-resonance may be an integer multiple of $2\pi$, thereby eliminating the cross-resonance rotation. For example, a phase may be added for the pulse applied on the second qubit (i.e., the qubit being not in communication with the neighboring qubit $Q_n$). It is notable that the terms in the Hamiltonian associated with the cross-resonance commute with the ZZ rotation. Thus, an advantage may be present, where first-order BCH terms may be absent.

The action of a MR pulse, in the subspace of the qubit q and the neighboring qubit $Q_n$, to first-order in $gt_g$:

$$e^{-iH(\phi_{MR})} \approx$$

$$e^{-i\frac{\Delta_n}{2}Zt_g} \times \exp\left\{-igt_g\left[\text{sinc}(\Delta_n t_g)X^{\phi_{MR}}Z + \frac{\sin^2\left(\frac{1}{2}\Delta_n t_g\right)}{\left(\frac{1}{2}\Delta_n t_g\right)}X^{\frac{\pi}{2}+\phi_{MR}}Z\right]\right\}$$

where single-qubit Pauli terms may be associated only with the qubit q. In two-qubit Pauli terms, the first letter is associated with the qubit q, and the second letter is associated with the neighboring qubit $Q_n$.

Adding the action of an echo pulse:

$$U_g(t_0, \phi_{MR}) \approx$$

$$\exp\left\{-igt_g\left[\text{sinc}(\Delta_n t_g)X^{\phi_{MR}+\Delta_n t_0}Z + \frac{\sin^2\left(\frac{1}{2}\Delta_n t_g\right)}{\left(\frac{1}{2}\Delta_n t_g\right)}X^{\frac{\pi}{2}+\phi_{MR}+\Delta_n t_g}Z\right]\right\}$$

Finally, the action of the EMR gate:

$$U_g(t_0 + t_g + t_x, \phi_{MR} + \pi) \times U_g(t_0, \phi_{MR}) \approx$$

$$\exp\left\{-igt_g\left[\text{sinc}(\Delta_n t_g)X^{\pi+\phi_{MR}^{(2)}+\Delta_n(t_0+t_g+t_x)}Z + \right.\right.$$

$$\left.\left.\frac{\sin^2\left(\frac{1}{2}\Delta_n t_g\right)}{\left(\frac{1}{2}\Delta_n t_g\right)}X^{\frac{3\pi}{2}+\phi_{MR}^{(2)}+\Delta_n(t_0+t_g+t_x)}Z\right]\right\} \times$$

$$\exp\left\{-igt_g\left[\text{sinc}(\Delta_n t_g)X^{\phi_{MR}^{(1)}+\Delta_n t_0}Z + \frac{\sin^2\left(\frac{1}{2}\Delta_n t_g\right)}{\left(\frac{1}{2}\Delta_n t_g\right)}X^{\frac{\pi}{2}+\phi_{MR}^{(1)}+\Delta_n t_g}Z\right]\right\}$$

The additional $\pi$ phase of the second application of rotation and echo pulses may be due to the echo pulses being applied on the two qubits $Q_{0,1}$.

Generally, parameters of the rotation pulses may be set so as to reduce effects of the crosstalk. In some embodiments, the phases $$\phi_{0,1}^{(i)}$$

may be configured to suppress the cross-resonance rotation (i.e., the effects of the crosstalk). In some embodiments, a difference between $$\phi_{MR}^{(1)} \text{ and } \phi_{MR}^{(2)}$$

and may be configured to suppress the cross-resonance rotation on the one qubit q and the neighboring qubit $Q_n$. In some embodiments, $$\phi_{MR}^{(1)}, \phi_{MR}^{(2)}$$

may be configured to eliminate the cross-sequence rotation. For example, the crosstalk may be eliminated if $$\phi_{MR}^{(1)} \text{ and } \phi_{MR}^{(2)}$$

are set so:

$$\phi_{MR}^{(1)} - \phi_{MR}^{(2)} = \Delta_n(t_g - t_x)$$

The above derivation is extendible also for cases where the neighboring qubit has crosstalk with both of the two qubits $Q_{0,1}$. A term for the crosstalk with the other qubit is added. In other words, without loss of generality, if in the above derivation the qubit q is a first qubit $Q_0$, a term for a crosstalk of the neighboring qubit $Q_n$ with a second qubit $Q_1$ is added.

If there is more than one neighboring qubit, and the neighboring qubits may have different resonant frequencies that may be close to the MR frequency, more complex application of method 100 may be required in order to eliminate the effect of crosstalk with all the neighboring qubits. For example, the ZZ rotation may be split to a plurality of sub-rotations (where some sub-rotations, or each sub-rotation, may be performed according to method 100), where the driving fields and echo pulses of the sub-rotation are configured so that the overall effect is elimination of the effect of crosstalk for all the neighboring qubits.

Reference is made to FIG. 2, showing a flowchart schematically illustrating a method 200 according to the present disclosure. The method 200 may be for performing a Pauli-rotation quantum gate. In other words, the method 200 may be for transforming a quantum state $|\psi\rangle$ to a quantum state $e^{i\alpha\sigma_a\sigma_b}|\psi\rangle$, where $\sigma_a$, $\sigma_b$ may each stand for any one of X, Y, Z Pauli-terms. The Pauli-rotation quantum gate may act on two qubits $Q_{0,1}$ (i.e., a first qubit may be denoted $Q_0$, a second qubit may be denoted $Q_1$). The two qubits $Q_{0,1}$ may have an XX coupling.

The method 200 may include a step 220 of base-shifting. The step 220 may include applying single-qubit rotations to at least one of the two qubits $Q_{0,1}$, so as to shift a basis of the at least one of the two qubits $Q_{0,1}$. The basis may be shifted from a measurement basis to a rotation basis. For example, the basis of the first qubit $Q_0$ may be shifted to the X basis. In another example, the basis of the first qubit $Q_0$ may be shifted to the Y basis, and the basis of the second qubit $Q_1$ may be shifted to the X basis.

The method 200 may include applying a ZZ rotation quantum gate to the two qubits $Q_{0,1}$. The ZZ rotation quantum gate may be performed as described hereinabove in the present disclosure. In other words, the method 200 may include a step 230 of applying a 1$^{st}$ rotation pulse. The step 230 may correspond step 130 (of method 100) described hereinabove, and may include performing actions as described thereof. The method 200 may include a step 240 of applying a 1$^{st}$ echo pulse. The step 240 may correspond step 140 (of method 100) described hereinabove, and may include performing actions as described thereof. The method 200 may include a step 250 of applying a $2^{nd}$ rotation pulse. The step 250 may correspond step 150 (of method 100) described hereinabove, and may include performing actions as described thereof. The method 200 may include a step 260 of applying a $2^{nd}$ rotation pulse. The step 260 may correspond step 160 (of method 100) described hereinabove, and may include performing actions as described thereof.

The method 200 may include a step 270 of shifting back. The step 270 may include applying single-qubit rotations to at least one of the two qubits $Q_{0,1}$, so as to shift back the basis of the at least one of the two qubits $Q_{0,1}$. The basis may be shifted from the rotation basis to the measurement basis. For example, the basis of the first qubit $Q_0$ may be shifted 5 back from the X basis. In another example, the basis of the first qubit $Q_0$ may be shifted back from the Y basis, and the basis of the second qubit $Q_1$ may be shifted back from the X basis.

Reference is made to FIG. 3, showing a flowchart schematically illustrating a method 300 according to the present disclosure. The method 300 may be for performing a general quantum gate. In other words, the method 300 may be for transforming a quantum state $|\psi\rangle$ to a quantum state $\hat{U}|\psi\rangle$, where $\hat{U}$ may denote a quantum operation. The quantum gate $\hat{U}$ may act on two qubits $Q_{0,1}$ (i.e., a first qubit may be denoted $Q_0$, a second qubit may be denoted $Q_1$). The two qubits $Q_{0,1}$ may have an XX coupling.

Generally, the method 300 may include performing the method 200, so as to perform at least one of: XX rotation, YY rotation, and/or ZZ rotation. Corresponding rotation angles of the rotations may according to a KAK decomposition of the two-qubit quantum gate.

In more detail, the method 300 may include a step 310 of applying preceding single-qubit gates. The preceding single-qubit gates may be according to the KAK decomposition of the two-qubit quantum gate.

The method 300 may include a step 320 of applying a XX rotation. The XX rotation may be by an angle $\alpha$. The step 320 may include a step 323 of shifting the basis of both qubits $Q_{0,1}$ to the X basis. The step 320 may include a step 325 of performing a ZZ rotation as described herein above.

The method 300 may include a step 330 of applying a YY rotation. The YY rotation may be by an angle $\beta$. The step 330 may include a step 333 of shifting the basis of both qubits $Q_{0,1}$ to the Y basis. The step 330 may include a step 335 of performing a ZZ rotation as described herein above.

The method 300 may include a step 340 of applying a ZZ rotation. The ZZ rotation may be by an angle $\gamma$. The step 340 may include a step 343 of shifting the basis of both qubits $Q_{0,1}$ to the Z basis. The step 340 may include a step 345 of performing a ZZ rotation as described herein above.

It is noted that a specific order of performing the XX, YY, ZZ rotations may not be required, as these rotations commute. In some embodiments, a specific order may be required, for example, due to non-ideality of available gates.

In some embodiments, where a ZZ rotation may be absent (i.e., step 340 may be absent), or where the ZZ rotation may not be performed last (i.e., step 320 and/or step 330 may be performed after step 340), the method 300 may include a step of shifting-back to the Z basis.

The method 300 may include a step 350 of applying succeeding single-qubit gates. The succeeding single-qubit gates may be according to the KAK decomposition of the two-qubit quantum gate.

In some embodiments, adjacent single-qubit quantum gates, applied in order to perform different steps, may be recompiled, so as to reduce a total number of quantum gates applied. For example, single-qubit quantum gates, applied so as to perform steps 310 and the first of steps 323 333 343, may be recompiled into a single single-qubit gate-layer.

Experimental Results

As echoed gates (i.e., gates performed by methods according to the present disclosure) and unechoed gates (as known in the art) are directly related, they can be easily compared, via simulations and executions on quantum computing devices. Methods according to the present disclosure were simulated according to the error-model of the publicly accessible "Brisbane" (also referred to as "ibm_brisbane") quantum-computation device, operated by the IBM corporation. Further, the echoed gates were also run on the "ibm_brisbane" quantum-computation device. The simulation and running were made in layer context according to IBM's EPLG scheme (see McKay, D. C., et. al., (2023), Benchmarking quantum processor performance at scale, arXiv:2311.05933), however the infidelity characterization protocol was different.

Reference is made to FIGS. 4A-4B. FIG. 4A presents a scatter graph showing simulated infidelity of bare ZZ-rotations. FIG. 4B presents a scatter graph showing simulated infidelity of ZZ-rotations performed using an error suppression method according to embodiments of the present disclosure. Each data-point represents application of ZZ-rotations on one qubit pair out of the 144 qubit-pairs of the device (that a two-qubit gate can be applied thereon), with a specific detuning from the MR frequency. The driving frequency of is given as a detuning from the MR frequency, and is given in units of $$\Delta_{MR} = \frac{\omega_1 - \omega_0}{2}.$$

In order to facilitate demonstrating the effect of the methods on coherent errors (i.e., oscillating errors), infinite coherence times were assumed in the simulations.

Close to the MR frequency, an un-echoed gate has a very low fidelity, as the XX–YY component oscillates slowly and generates very large coherent errors. Whereas, for an echoed gate, this is the optimal region. At about a quarter of the way to the resonant frequencies, the XX–YY component rotates fast enough so that the echoing is no longer an advantage. Hence, the echoed pulses are most effective in the frequency range where approximately $$\frac{1}{8}(5\omega_0 + 3\omega_1) \le \omega \le \frac{1}{8}(3\omega_0 + 5\omega_1).$$

Of course, the exact range depends on the parameters of the pulse, on the parameters of the quantum computation device, and on the desired effectiveness. However, this is a good estimate for typical parameters. The edges of this range are the optimal point for the un-echoed pulse, but typically, this still results in an order of magnitude higher infidelity than the optimal point for the echoed pulse (which deviates slightly from the MR point, due to Stark shifts). Therefore, it is concluded that the echoed pulses are an order of magnitude better, in terms of infidelity, compared to the un-echoed ones.

Reference is made to FIG. 5, presenting a scatter graph showing a normalized magnitude of simulated ZZ-rotations performed by methods according to the present disclosure.

The simulation above (having results described herein-above in relation to FIGS. 4A-4B) does not include coherence times and only simulates inherent infidelity stemming from the 3-level system Hamiltonian with the presented drive (hence, in some cases the values of the infidelity are very low). FIG. 5 shows the ZZ Hamiltonian term for different frequencies, for the same qubit pairs as the previous figure (i.e., each qubit pair out of the 144 qubit-pairs of the device that a two-qubit gate can be applied thereon). The Hamiltonian ZZ term is given normalized to its optimal (maximal) value. The driving frequency is given as the detuning from the MR frequency, and is given in units of $$\Delta_{MR} = \frac{\omega_1 - \omega_0}{2}.$$

Here too, it can be seen that the optimal value is usually in the $$\frac{1}{8}(5\omega_0 + 3\omega_1) \leq \omega \leq \frac{1}{8}(3\omega_0 + 5\omega_1)$$

frequency range, and can decrease sharply outside of it. The echo enables operating (performing a ZZ gate) at the optimal value, thereby decreasing the duration of the gate and hence the infidelity. In addition, echo pulses compensate for the Z directional noise, both coherent noise and noise due to slow varying fluctuations. This is significant, as slow varying fluctuations are a main source for decoherence.

Reference is made to FIGS. 6A-6B, presenting bar charts demonstrating the performance of the gate and the error suppression methods according to embodiments of the present disclosure. FIG. 6A shows infidelities for 25 qubit pairs, of EMR gates (light shaded dataset) versus the native CR gate (dark shaded dataset). The x-axis labels are the qubit pairs, ordered according to the device's enumeration of qubits. The average infidelity value for the CR gates is 1.82%, whereas for the EMR gates the average infidelity value is 0.64%. FIG. 6B shows infidelities of EMR gates for 13 qubit pairs. The x-axis labels are the qubit pairs, ordered according to the device's enumeration of qubits. Some of the EMR gates are performed with a phase shift to compensate crosstalk (dark shaded dataset), and some are performed without the phase shift (light shaded dataset). The 13 qubit pairs FIG. 6B relates to, are the qubit pairs having the strongest crosstalk with a neighboring qubit, in the "Brisbane" quantum-computation device. In all the 13 qubit pairs, the resonance frequency of the neighboring qubit is no more than 5 MHz away from the MR frequency. In some cases (such as qubit pairs (12,13) and (58, 59)) the resonance frequency of the neighboring qubit is within about just 1 MHz away from the MR frequency. Applying the phase shift enormously effects these pairs, often reducing the infidelity from the O(10%) range to the O(1%) range.

The results of the experiments demonstrate an average improvement of infidelity by almost a factor of 3 compared to CR gates, and a consistent improvement—every qubit pair showed improved fidelity. Concluding, the EMR gate was demonstrated to be both superior to the un-echoed gate demonstrated in [Nguyen et al., 2024], and the widely used CR gate.

FIG. 7 and the following discussion are intended to provide a brief, general description of an exemplary computing environment in which the disclosed technology may be implemented. Although not required, the disclosed technology is described in the general context of computer executable instructions, such as program modules, being executed by a personal computer (PC). Generally, program modules include routines, programs, objects, components, data structures, etc., that perform particular tasks or implement particular abstract data types. Moreover, the disclosed technology may be implemented with other computer system configurations, including handheld devices, multiprocessor systems, microprocessor-based or programmable consumer electronics, network PCs, minicomputers, mainframe computers, and the like. The disclosed technology may also be practiced in distributed computing environments where tasks are performed by remote processing devices that are linked through a communications network. In a distributed computing environment, program modules may be located in both local and remote memory storage devices.

With reference to FIG. 7, an exemplary system for implementing the disclosed technology includes a general purpose (classical) computing device in the form of an exemplary conventional PC 700, including one or more processing units 710, a system memory 720, and a system bus 730 that couples various system components including the system memory 720 to the one or more processing units 710. The system bus 730 may be any of several types of bus structures including a memory bus or memory controller, a peripheral bus, and/or a local bus using any of a variety of bus architectures. The exemplary system memory 720 includes read only memory (ROM) 722 and random-access memory (RAM) 727. A basic input/output system (BIOS) 725, containing the basic routines that help with the transfer of information between elements within the PC 700, is stored in ROM 722. As shown in FIG. 7, the system memory 720 may store computer-executable instructions for performing any of the disclosed techniques (e.g., sending instructions to quantum computer for applying characterization gate sequences and neighboring gate sequences to a subset of qubits, measuring outcomes, collecting frequencies, computing model parameters) in respective memory portions (shown generally as executable software 729 for performing any embodiment of the disclosed synthesis techniques).

The exemplary PC 700 further includes one or more storage devices 740, such as a hard disk drive for reading from and writing to a hard disk, a magnetic disk drive for reading from or writing to a removable magnetic disk, and/or an optical disk drive for reading from or writing to a removable optical disk (such as a CD-ROM or other optical media). Such storage devices can be connected to the system bus 730 by a hard disk drive interface, a magnetic disk drive interface, and/or an optical drive interface, respectively. The drives and their associated computer readable media provide nonvolatile storage of computer-readable instructions, data structures, program modules, and other data for the PC 700. Other types of computer-readable media which can store data that is accessible by a PC, such as magnetic cassettes, flash memory, digital video disks, CDs, DVDs, RAMs, NVRAMs, ROMs, and the like, may also be used in the exemplary operating environment. As used herein, the terms storage, memory, and computer-readable media may not include or encompass propagating carrier waves or signals per se.

A number of program modules may be stored in the storage devices 740, including an operating system, one or more application programs, other program modules, and program data. Storage of results of quantum measurements and instructions for obtaining such measurements (and/or instructions for performing any embodiment of the disclosed technology) can be stored in the storage devices 740. A user may enter commands and information into the PC 700 through one or more input devices 750 such as a keyboard and a pointing device such as a mouse. Other input devices may include a digital camera, microphone, joystick, game pad, satellite dish, scanner, or the like. These and other input devices are often connected to the one or more processing units 710 through a serial port interface that is coupled to the system bus 730, but may be connected by other interfaces such as a parallel port, game port, or universal serial bus (USB). A monitor 780 or other type of display device is also connected to the system bus 730 via an interface, such as a video adapter. Other peripheral output devices 760, such as speakers and printers (not shown), may be included. In some cases, a user interface is displayed so that a user can input a circuit for synthesis, and verify successful synthesis.

The PC 700 may operate in a networked environment using logical connections to one or more remote computers, such as a remote computer 790. In some examples, one or more network or communication connections 770 are included. The remote computer 790 may be another PC, a server, a router, a network PC, or a peer device or other common network node, and typically includes many or all of the elements described above relative to the PC 700, although only a memory storage device 795 has been illustrated in FIG. 7. The personal computer 700 and/or the remote computer 790 can be connected to a local area network (LAN) and a wide area network (WAN). Such networking environments are commonplace in offices, enterprise-wide computer networks, intranets, and the Internet.

When used in a LAN networking environment, the PC 700 is connected to the LAN through a network interface. When used in a WAN networking environment, the PC 700 typically includes a modem or other means for establishing communications over the WAN, such as the Internet. In a networked environment, program modules depicted relative to the personal computer 700, or portions thereof, may be stored in the remote memory storage device or other locations on the LAN or WAN. The network connections shown are exemplary, and other means of establishing a communications link between the computers may be used.

With reference to FIG. 8, an exemplary system for implementing the disclosed technology includes computing environment 800, The environment includes one or more quantum processing unit(s) 810 including one or more monitoring/measuring device(s). The quantum processing unit(s) execute quantum circuits that are provided by a classical processing unit 820. The quantum circuits are downloaded into or used to program or configure the quantum processing unit(s) 810 (e.g., via control lines (quantum bus) 870). Procedures according to any of the disclosed embodiments (e.g., a high-level description of the set of quantum circuits to be applied to a qubit patch and neighboring qubits) may be stored in a memory 830.

With reference to FIG. 8, the high-level description of a quantum software may be translated into quantum circuits (e.g., sequences of quantum gates, or layers of gates acting in parallel on different qubits). Such high-level descriptions may be stored, as the case may be, on one or more external computers 860 outside the computing environment 800 utilizing one or more memory and/or storage device(s) 865, then downloaded as necessary into the computing environment 800 via one or more communication connection(s) 840. Quantum circuits (according to any of the disclosed embodiments) are coupled to the quantum processor 810.

The quantum processing unit(s) can be one or more of, but are not limited to: (α) a superconducting quantum computer; (b) an ion trap quantum computer; (c) a topological quantum computer using e.g., Majorana zero modes; (d) a photonic quantum computer; or (e) a neutral atom quantum computer. The sets of gates (e.g., using any of the disclosed embodiments) can be sent into (or otherwise applied to) the quantum processing unit(s) via control lines 870 at a controller 850. In the illustrated example, the desired quantum computing process is implemented with the aid of one or more controllers 850 that are specially adapted to control a corresponding one of the quantum processor(s) 810. The classical processor 820 can further interact with measuring/monitoring devices (e.g., readout devices) 880 to help control and implement the desired quantum computing process (e.g., by reading or measuring out data results from the quantum processing units once available, etc.)

The foregoing description of embodiments of the invention has been presented only for the purpose of illustration and description and is not intended to be exhaustive or to limit the invention to the precise forms disclosed. Numerous modifications and adaptations thereof will be apparent to those skilled in the art without departing from the spirit and scope of the present invention. For instance, technologies from any example can be combined with the technologies described in any one or more of the other examples.

Therefore, casting into a language of clauses, the present disclosure provides methods, systems and circuits according to, but not limited to, the following clauses:

Clause 1: A method for performing a ZZ-rotation quantum gate acting on two qubits $Q_{0,1}$ having an XX coupling, each of said two qubits having a corresponding resonance frequency $\omega_{0,1}$, the method includes applying twice:

(a) to each of said two qubits, a corresponding rotation pulse having:

i) a driving frequency $\omega^{(i)}$ distinct from each of said resonance frequencies $\omega_{0,1}$, so that each of said two qubits is having a corresponding detuning $$\Delta_{0,1}^{(i)} = \omega^{(i)} - \omega_{0,1};$$

ii) a corresponding amplitude $$\Omega_{0,1}^{(i)},$$

so that each of said two qubits having a corresponding effective frequency $$\overline{\Omega}_{0,1}^{(i)} \text{ being } \overline{\Omega}_{0,1}^{(i)} = \theta\left(\Delta_{0,1}^{(i)}\right) \cdot \sqrt{\Delta^{(i)2}_{0,1} + \Omega^{(i)2}_{0,1}},$$

wherein $\theta(x)$ is the sign function;

iii) a corresponding phase $$\phi_{0,1}^{(i)};$$

thereby, each rotation pulse having a Hamiltonian $$H_p = \Omega_{0,1}^{(i)} \hat{X}_{0,1} \cos\left(\omega^{(i)} t + \phi_{0,1}^{(i)}\right),$$

wherein $\hat{X}_{0,1}$ is a corresponding Pauli-X operator;

(b) an echo pulse commuting with a Pauli-ZZ operator associated with said two qubits, so as to control a magnitude of any one of:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation,}$$

wherein said echo pulse is applied after said rotation pulse;

wherein each application (i) of said rotation pulses is associated with a corresponding set of driving frequency $\omega^{(i)}$, amplitudes $$\Omega_{0,1}^{(i)}$$

and phases $$\phi_{0,1}^{(i)}.$$

Clause 2: The method according to clause 1, wherein said echo pulses are configured to eliminate any one of said:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

Clause 3: The method according to clause 2, wherein said echo pulses are configured to eliminate both of said $$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

Clause 4: The method according to any one of clauses 1 to 3, wherein said corresponding echo pulses having an action $[\hat{X}_0 \cos(\omega_0) + \hat{Y}_0 \sin(\psi_0)] \otimes [\hat{X}_1 \cos(\psi_1) + \hat{Y}_1 \sin(\psi_1)]$, wherein $\psi_0, \psi_1$ are predetermined phases corresponding said two qubits $Q_{0,1}$.

Clause 5: The method according to clause 4, wherein any one of the following:

(a) a sum of phases $$\phi_{MR}^{(1)} = \phi_0^{(1)} + \phi_1^{(1)}$$

associated with a first application of said rotation pulses, (b) a sum of phases $$\phi_{MR}^{(2)} = \phi_0^{(2)} + \phi_1^{(2)}$$

associated with a second application of said rotation pulses, and (c) a sum of phases $$\psi = \psi_0 + \psi_1.$$

is configured for any one of:

i. control a magnitude of any one of said:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation,}$$

and eliminating the other, and ii. eliminate both of said:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

Clause 6: The method according to any one of clauses 4 to 5, wherein any of said corresponding echo pulses having any one of actions: XY and YX.

Clause 7: The method according to any one of clauses 1 to 6, wherein a difference of said corresponding phases $$\phi_0^{(i)} - \phi_1^{(i)}$$

equals an integer multiple of π.

Clause 8: The method according to any one of clauses 1 to 7, wherein a driving frequency $\omega^{(1)}$ associated with a first application of said rotation pulses equals a driving frequency $\omega^{(2)}$ associated with a second application of said rotation pulses; and, wherein an amplitude $\Omega^{(1)}$ associated with a first application of said rotation pulses equals an amplitude $\Omega^{(2)}$ associated with a second application of said rotation pulses.

Clause 9: The method according to any one of clauses 1 to 8, wherein said two qubits $Q_{0,1}$ are implemented based on two energy levels included in a multi-level quantum system.

Clause 10: The method according to any one of clauses 1 to 9, wherein said echo pulses are configured to eliminate a IZ noise and a ZI noise.

Clause 11: The method according to any one of clauses 1 to 10, wherein said driving frequency $\omega^{(i)}$ is between a lower resonance frequency $\omega_0$ and a higher resonance frequency $\omega_1$.

Clause 12: The method according to clause 11, wherein said driving frequency $\omega^{(i)}$ is in the range of $$\frac{1}{8}(5\omega_0 + 3\omega_1) \text{ to } \frac{1}{8}(3\omega_0 + 5\omega_1).$$

Clause 13: The method according to clause 12, wherein said driving frequency $\omega^{(i)}$ is an average of said resonance frequencies $\omega_{0,1}$.

Clause 14: The method according to any one of clauses 1 to 10, wherein said driving frequency $\omega^{(i)}$ is lower than a lower resonance frequency $\omega_0$, or higher than a higher resonance frequency $\omega_1$.

Clause 15: The method according to any one of clauses 1 to 14, wherein one qubit q of said two qubits $Q_{0,1}$ is in communication with a neighboring qubit $Q_n$, wherein a difference between:

(a) sum of phases $$\phi_{MR}^{(1)} = \phi_0^{(1)} + \phi_1^{(1)}$$

associated with a first application of said rotation pulses, and
(b) a sum of phases $$\phi_{MR}^{(2)} = \phi_0^{(2)} + \phi_1^{(2)}$$

associated with a second application of said rotation pulses,
is configured to suppress a cross-resonance rotation on said one qubit q and said neighboring qubit $Q_n$.

Clause 16: The method according to clause 15, wherein said sums of phases $$\phi_{MR}^{(1)}, \phi_{MR}^{(2)}$$

are configured to eliminate a cross-resonance rotation on said one qubit q and said neighboring qubit $Q_n$.

Clause 17: The method according to any one of clauses 1 to 16, wherein a ZZ rotation angle $\alpha_1$ associated with a first application of said rotation pulses, is equal to a ZZ rotation angle $\alpha_2$ associated with a second application of said rotation pulses.

Clause 18: A method for performing a two-qubit Pauli-rotation quantum gate acting on two qubits $Q_{0,1}$ having an XX coupling, the method comprises:
(a) applying single-qubit rotations to at least one of said two qubits $Q_{0,1}$, so as to shift a basis of said at least one of said two qubits $Q_{0,1}$ from a measurement basis to a rotation basis;
(b) applying a ZZ-rotation quantum gate to said two qubits $Q_{0,1}$, said ZZ-rotation quantum gate being according to any one of clauses 1 to 17;
(c) applying single-qubit rotations to at least one of said two qubits $Q_{0,1}$, so as to shift back a basis of said at least one of said two qubits $Q_{0,1}$ from a rotation basis to a measurement basis.

Clause 19: A method for performing a two-qubit quantum gate acting on two qubits $Q_{0,1}$ having an XX coupling, the method comprises performing the method according to clause 18 so as to perform at least one of: XX rotation, YY rotation, and ZZ rotation, wherein corresponding rotation angles of said rotations are according to a KAK decomposition of said two-qubit quantum gate.

Clause 20: A quantum processing unit, comprising:
(a) at least two qubits having an XX coupling;
(b) at least one pulse generator coupled to said at least two qubits, so as to apply pulses to said at least two qubits; and
(c) a controller communicating with said at least one pulse generator, so as to provide commands to said at least one pulse generator;
said quantum processing unit is configured to implement the method according to any one of the clauses 1 to 19.

Clause 21: The quantum processing unit according to clause 20, wherein said at least one pulse generator is configured to apply radiofrequency pulses.

Clause 22: The quantum processing unit according to clause 21, wherein said two qubits $Q_{0,1}$ are superconducting qubits.

Clause 23: The quantum processing unit according to clause 22, wherein said at least one pulse generator is configured to apply any one of: infrared pulses, visible light pulses, and ultraviolet pulses.

Clause 24: A system comprising a computer and a quantum processing unit, the computer having a pulse-level access to the quantum processing unit, the system is configured to implement the method according to any one of the clauses 1 to 19.

Clause 25: The system according to clause 24, wherein said quantum processing unit is according to any one of clauses 20 to 23.

Clause 26: A non-transient computer readable storage medium, storing computer instructions, wherein the computer instructions are used for causing a computer communicating with a quantum processing unit, to implement the method according to any one of the clauses 1 to 19.

Clause 27: A computer implemented method, the method includes simulating application of a ZZ-rotation quantum gate according to any one of clauses 1 to 19.

Clause 28: A non-transient computer readable storage medium, storing computer instructions, wherein the computer instructions are used for causing a computer to perform the method according to clause 28.

The invention claimed is:

1. A method for performing a ZZ-rotation quantum gate acting on two qubits $Q_{0,1}$ having an XX coupling, each of said two qubits having a corresponding resonance frequency $\omega_{0,1}$, the method comprising applying twice:
(a) to each of said two qubits, a corresponding rotation pulse having:
i) a driving frequency $\omega^{(i)}$ distinct from each of said resonance frequencies $\omega_{0,1}$, so that each of said two qubits is having a corresponding detuning $$\Delta_{0,1}^{(i)} = \omega^{(i)} - \omega_{0,1};$$

ii) a corresponding amplitude $\Omega_{0,1}{}^{(i)}$, so that each of said two qubits having a corresponding effective frequency $$\overline{\Omega}_{0,1}^{(i)} \text{ being } \overline{\Omega}_{0,1}^{(i)} = \theta(\Delta_{0,1}^{(i)}) \cdot \sqrt{\Delta_{0,1}^{(i)2} + \Omega_{0,1}^{(i)2}},$$

wherein $\theta(x)$ being the sign function;
iii) a corresponding phase $$\phi_{0,1}^{(i)};$$

thereby, each rotation pulse having a Hamiltonian $$H_p = \Omega_{0,1}^{(i)} \hat{X}_{0,1} \cos(\omega^{(i)} t + \phi_{0,1}^{(i)}),$$

wherein $\hat{X}_{0,1}$ being a corresponding Pauli-X operator;
  (b) an echo pulse commuting with a Pauli-ZZ operator associated with said two qubits, so as to control a magnitude of any one of:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation,}$$

wherein said echo pulse is applied after said rotation pulse; wherein each application (i) of said rotation pulses is associated with a corresponding set of driving frequency $\omega^{(i)}$, amplitudes $$\Omega_{0,1}^{(i)}$$

and phases $$\phi_{0,1}^{(i)}.$$

2. The method according to claim 1, wherein said echo pulses are configured to eliminate any one of said:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

3. The method according to claim 2, wherein said echo pulses are configured to eliminate both of said $$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

4. The method according to claim 1, wherein said corresponding echo pulses having an action $[\hat{X}_0 \cos(\psi_0)+\hat{Y}_0 \sin(\psi_0)]\otimes[\hat{X}_1 \cos(\psi_1)+\hat{Y}_1 \sin(\psi_1)]$, wherein $\psi_0,\psi_1$ being predetermined phases corresponding said two qubits $Q_{0,1}$.

5. The method according to claim 4, wherein an one of the following:
  (a) a sum of phases $$\phi_{MR}^{(1)} = \phi_0^{(1)} + \phi_1^{(1)}$$

associated with a first application of said rotation pulses,
  (b) a sum of phases $$\phi_{MR}^{(2)} = \phi_0^{(2)} + \phi_1^{(2)}$$

associated with a second application of said rotation pulses, and
  (c) a sum of phases
  $\psi=\psi_0+\psi_1$,
is configured for any one of:
  i. control a magnitude of any one of said:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation,}$$

and eliminating the other, and
  ii. eliminate both of said:

$$XX + \theta\left(\Delta_0^{(i)}\Delta_1^{(i)}\right) \cdot YY \text{ rotation, and } XY - \theta\left(\Delta_0^{(i)}\Delta_1^{(i)}\right) \cdot YX \text{ rotation.}$$

6. The method according to claim 4, wherein any of said corresponding echo pulses having any one of actions: XY and YX.

7. The method according to claim 1, wherein a difference of said corresponding phases $$\phi_0^{(i)} - \phi_1^{(i)}$$

equals an integer multiple of $\pi$.

8. The method according to claim 1, wherein a driving frequency $\omega^{(1)}$ associated with a first application of said rotation pulses equals a driving frequency $\omega^{(2)}$ associated with a second application of said rotation pulses; and, wherein an amplitude $\Omega^{(1)}$ associated with a first application of said rotation pulses equals an amplitude $\Omega^{(2)}$ associated with a second application of said rotation pulses.

9. The method according to claim 1, wherein said two qubits $Q_{0,1}$ are implemented based on two energy levels included in a multi-level quantum system.

10. The method according to claim 1, wherein said echo pulses are configured to eliminate a IZ noise and a ZI noise.

11. The method according to claim 1, wherein said driving frequency $\omega^{(i)}$ is between a lower resonance frequency $\omega_0$ and a higher resonance frequency $\omega_1$.

12. The method according to claim 11, wherein said driving frequency $\omega^{(i)}$ is in the range of $$\frac{1}{8}(5\omega_0 + 3\omega_1) \text{ to } \frac{1}{8}(3\omega_0 + 5\omega_1).$$

13. The method according to claim 12, wherein said driving frequency $\omega^{(i)}$ is an average of said resonance frequencies $\omega_{0,1}$.

14. The method according to claim 1, wherein said driving frequency $\omega^{(i)}$ is lower than a lower resonance frequency $\omega_0$, or higher than a higher resonance frequency $\omega_1$.

15. The method according to claim 1, wherein one qubit q of said two qubits $Q_{0,1}$ is being in communication with a neighboring qubit $Q_n$, wherein a difference between:
  a) sum of phases $$\phi_{MR}^{(1)} = \phi_0^{(1)} + \phi_1^{(1)}$$

associated with a first application of said rotation pulses, and
  (b) a sum of phases $$\phi_{MR}^{(2)} = \phi_0^{(2)} + \phi_1^{(2)}$$

associated with a second application of said rotation pulses, is configured to suppress a cross-resonance rotation on said one qubit q and said neighboring qubit $Q_n$.

16. The method according to claim 15, wherein said sums of phases $$\phi_{MR}^{(1)}, \phi_{MR}^{(2)}$$

are configured to eliminate a cross-resonance rotation on said one qubit q and said neighboring qubit $Q_n$.

17. The method according to claim 1, wherein a ZZ rotation angle $\alpha_1$ associated with a first application of said rotation pulses, is equal to a ZZ rotation angle $\alpha_2$ associated with a second application of said rotation pulses.

18. A quantum processing unit, comprising:
(a) at least two qubits having an XX coupling;
(b) at least one pulse generator coupled to said at least two qubits, so as to apply pulses to said at least two qubits; and (c) a controller communicating with said at least one pulse generator, so as to provide commands to said at least one pulse generator;
said quantum processing unit being configured to implement the method according a to claim 1; said at least one pulse generator is configured to apply radiofrequency pulses, and said two qubits $Q_{0,1}$ are superconducting qubits.

19. A system comprising a computer and a quantum processing unit, the computer having a pulse-level access to the quantum processing unit, the system being configured to implement the method according to claim 1.

20. A non-transient computer readable storage medium, storing computer instructions, wherein the computer instructions are used for causing a computer communicating with a quantum processing unit, to implement the method according to claim 1.

\* \* \* \* \*